(12) United States Patent
Huang et al.

(10) Patent No.: US 9,549,433 B2
(45) Date of Patent: Jan. 17, 2017

(54) MOBILITY MANAGEMENT UNIT AND WIRELESS SIDE NETWORK ELEMENT, AND METHOD AND DEVICE FOR RELEASING LOCAL IP ACCESS CONNECTION

(71) Applicant: ZTE Corporation, Shenzhen, Guangdong (CN)

(72) Inventors: Ying Huang, Shenzhen (CN); Shuang Liang, Shenzhen (CN); Feng Xie, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/443,768

(22) PCT Filed: Nov. 19, 2013

(86) PCT No.: PCT/CN2013/087456
§ 371 (c)(1),
(2) Date: May 19, 2015

(87) PCT Pub. No.: WO2014/075644
PCT Pub. Date: May 22, 2014

(65) Prior Publication Data
US 2015/0305085 A1    Oct. 22, 2015

(30) Foreign Application Priority Data

Nov. 19, 2012 (CN) .......................... 2012 1 0468295

(51) Int. Cl.
*H04W 4/00* (2009.01)
*H04W 76/06* (2009.01)
(Continued)

(52) U.S. Cl.
CPC ............. *H04W 76/06* (2013.01); *H04W 8/082* (2013.01); *H04W 36/0061* (2013.01)

(58) Field of Classification Search
None
See application file for complete search history.

(56) References Cited

U.S. PATENT DOCUMENTS

| 2012/0076121 A1* | 3/2012 | Choi | H04W 76/062 |
| | | | 370/338 |
| 2012/0170454 A1* | 7/2012 | Takano | H04W 8/082 |
| | | | 370/230 |

(Continued)

FOREIGN PATENT DOCUMENTS

| CN | 101998370 A | 3/2011 |
| CN | 102056145 A | 5/2011 |

(Continued)

OTHER PUBLICATIONS

Supplementary European Search Report in European application No. 13855012.4, mailed on Oct. 30, 2015.

(Continued)

*Primary Examiner* — Anh-vu Ly
(74) *Attorney, Agent, or Firm* — Oppedahl Patent Law Firm LLC

(57) ABSTRACT

A method for releasing a LIPA connection is provided, which includes that a MME executes a LIPA connection releasing check according to received LIPA connection releasing auxiliary information, and judges whether to release a LIPA connection of UE; or, a wireless-side network element executes a LIPA connection releasing check according to received LIPA connection releasing auxiliary information, and judges whether to release the LIPA connection of the UE. A device for releasing a LIPA connection, an MME and a wireless-side network element are also provided. According to the technical solutions of the present disclosure, under the condition that a mobile relay supports LIPA, continuity of the LIPA connection of the UE in an Mobile Relay Node (MRN) handover process is ensured, (Continued)

continuity of a LIPA service of the UE is further ensured, and the quality of service for a user and a user experience are improved.

9 Claims, 10 Drawing Sheets

(51) Int. Cl.
*H04W 8/08* (2009.01)
*H04W 36/00* (2009.01)

(56) References Cited

U.S. PATENT DOCUMENTS

| | | |
|---|---|---|
| 2012/0189016 A1 | 7/2012 | Bakker |
| 2012/0207137 A1 | 8/2012 | Zhou |
| 2012/0300750 A1* | 11/2012 | Chin .................. H04W 36/0022 370/331 |
| 2013/0188604 A1 | 7/2013 | Chin |
| 2013/0308527 A1 | 11/2013 | Chin |
| 2013/0337812 A1* | 12/2013 | Pekonen ............. H04W 76/062 455/436 |
| 2015/0092665 A1 | 4/2015 | Choi et al. |

FOREIGN PATENT DOCUMENTS

| | | |
|---|---|---|
| CN | 102209398 A | 10/2011 |
| JP | 2012523137 A | 9/2012 |
| KR | 1020120093072 A | 8/2012 |
| WO | 2012050841 A1 | 4/2012 |
| WO | 2012095114 A1 | 7/2012 |
| WO | 2012100199 A2 | 7/2012 |

OTHER PUBLICATIONS

Idle state mobility for Local PDN connection, mailed on Oct. 2012.
International Search Report in international application No. PCT/CN2013/087456, mailed on Feb. 27, 2014.
English Translation of the Written Opinion of the International Search Authority in international application No. PCT/CN2013/087456, mailed on Feb. 27, 2014.

* cited by examiner

MOBILITY MANAGEMENT UNIT AND WIRELESS SIDE NETWORK ELEMENT, AND METHOD AND DEVICE FOR RELEASING LOCAL IP ACCESS CONNECTION

TECHNICAL FIELD

The present disclosure relates to a Local Internet Protocol Access (LIPA) releasing technology, and in particular to a method and device for releasing a LIPA connection based on a Mobile Relay Node (MRN), and a mobility management unit and a wireless-side network element thereof.

BACKGROUND

In a Long Term Evolution-Advanced (LTE-Advanced) standard-based wireless relay technology proposed by the 3rd Generation Partnership Project (3GPP) standard organization, a Relay Node (RN) provides a function and service similar to those of an ordinary Evolved Node B (eNB) for User Equipment (UE) accessing a cell of the RN, and also accesses a serving eNB (also called a Donor eNB (DeNB)) like ordinary UE through a wireless interface. Along with the large-scale construction and operation of high-speed railways, requirements on communication on trains continuously increase. However, it is difficult to meet a communication quality requirement of the high-speed railways under the coverage of an existing network eNB due to influence of Doppler frequency shift, frequent cell handover, great high-speed railway compartment penetration loss and the like on high-speed moving trains. Consequently, the deployment of RNs on high-speed railways is proposed in the industry, and such RNs are usually called mobile relays. FIG. 1 is an architecture diagram of a mobile relay system supporting a LIPA function in a high-speed railway scenario, and as shown in FIG. 1, users (UE1 and UE2) in a high-speed train can communicate with a relatively static MRN by virtue of a mobile relay technology, and in a moving process of the high-speed train, the MRN can be handed over between different DeNBs, thereby avoiding simultaneous handover of a great number of users in the high-speed train and ensuring quality of communication between the UE and the MRN. In addition, enhancing a backbone connection between the MRN and the DeNB may better improve the quality of communication between the users in the high-speed train. There is a LIPA Gateway (GW) arranged in an MRN shown in FIG. 1.

A mobile relay may adopt an architecture shown in FIG. 2 (the architecture the same as a standardized R10 fix relay, usually called architecture 2), and then a Serving Gateway (S-GW), Packet Data Network Gateway (P-GW) and relay GW of an MRN are located in the DeNB (called an initial DeNB) to which MRN initially accesses. The relay GW in the DeNB provides a proxy function for data and signaling of an S1 interface and an X2 interface. In such an architecture, when the MRN moves far away from the initial DeNB, data of UE arrives at the initial DeNB and then is routed to the serving DeNB, which causes a longer path and a longer delay. As a consequence, it is necessary to consider about a route optimization scheme, and when the MRN moves far away from the initial DeNB, the GW of the MRN is changed into a built-in GW of a DeNB serving the MRN. As shown in FIG. 3, if before the handover of the MRN, its GW (GW1) is located in DeNB1 while it is DeNB3 currently providing service for the MRN, then the data of the UE arrives at the GW of DeNB1 and then is routed to DeNB3 through DeNB2, which undoubtedly causes the prolonging of a data routing path. The MRN may relocate its GW to a built-in GW (GW4) of DeNB4 in a process of handover, for example, handover from DeNB3 to DeNB4, so that the data of the UE can directly arrive at DeNB4, the path is shortened, and the data delay is reduced.

In addition, in order to better meet a requirement of a user and further improve a user experience, 3GPP takes a LIPA supporting function of a mobile relay into consideration to provide a high-speed local service for UE of an LTE system and save a bandwidth resource of a backhaul link of an air interface. For example, the UE can be connected with a local Packet Data Network (PDN) to acquire a multimedia resource through a Line Gateway (LGW) combined with the MRN, or support a multiuser social network application such as file sharing, chatting and games through a local server. As shown in FIG. 1, an LGW function entity can be arranged in an MRN in a carriage. The LGW is connected with the PDN through a Security Gateway Interface (SGi). For connected-state UE with a LIPA connection, a direct tunnel for LIPA service data exists between the LGW and the MRN, and moreover, an S5 interface core network tunnel is established between the LGW in the MRN and the SGW of the UE for paging of IDLE-state UE and for S5 signaling transmission. After UE with a LIPA PDN connection enters an IDLE state, its direct tunnel is released, and the core network tunnel is reserved.

Under the condition that the mobile relay supports LIPA, the MRN is disconnected from an S-GW network element. Moreover, because the LGW and the MRN are combined into a whole, all data which is sent to the LGW combined with the MRN by a network element of a core network can arrive only after subjected to the routing of an RN P-GW combined with the DeNB. Consequently, the RN P-GW is required to allocate an IP address to the LGW, and the LGW may use an IP address the same as or different from that of the MRN. If handover occurs and the GW serving the MRN is relocated in a movement process of the MRN, a new PGW serving the MRN is required to allocate a new IP address to the LGW, that is, the address of the LGW may be changed.

An existing protocol specification does not support mobility of a LIPA PDN connection. In a Home Evolved Node B (HeNB) application scenario, if UE initiates Tracking Area Update (TAU), a source Mobility management unit (MME) serving the UE needs to check whether a LIPA PDN connection exists or not, and if the LIPA PDN connection exists, an Evolved Packet System (EPS) bearer context of the source MME in a TAU process does not contain a LIPA bearer, and a PDN disconnection process requested by the MME is executed to release a core network resource of the LIPA PDN connection. If the UE initiates a service request process and has the LIPA PDN connection, the MME needs to judge whether a cell where the UE is currently located is connected with the LGW with which the UE establishes the LIPA PDN connection according to the address of the LGW. If the cell is not connected with the LGW, the MME does not request for bearer establishment of the LIPA PDN connection, and executes a LIPA PDN releasing process, or the MME denies the service request and detaches the UE.

In a high-speed railway scenario, the MRN supports a LIPA function, and if UE does not move relative to the MRN and is still served by the same MRN and LGW, its LIPA PDN connection is not required to be released in TAU and service request processes of the UE. According to the existing protocol specification, once the UE with a LIPA connection initiates TAU, the MME releases its LIPA PDN connection. Moreover, if the GW is relocated after DeNB handover of the MRN, the address of the LGW combined with the MRN may be changed, and if the address of the LGW has been changed relative to the address in the last connected state when the IDLE-state UE initiates a service request, the LIPA PDN connection of the UE is released, the service request is even denied and the UE is detached. As a consequence, the abovementioned LIPA connection releasing problem needs to be solved in a scenario where the mobile relay supports LIPA.

Unfortunately, there is no related art for reference at present.

SUMMARY

In view of this, a main purpose of the present disclosure is to provide a method and device for releasing a LIPA connection, and a mobility management unit and a wireless-side network element thereof, which can smoothly hand over a LIPA connection of UE moving under a mobile relay node (MRN).

In order to achieve the purpose, the technical solutions of the present disclosure are implemented as follows.

A method for releasing a LIPA connection is provided, which includes that:

a mobility management unit executes a LIPA connection releasing check according to received LIPA connection releasing auxiliary information, and judges whether to release a LIPA connection of UE or not.

Preferably, the LIPA connection releasing auxiliary information may include at least one piece of information as follows:

LIPA connection releasing indication information; and
identifier information of a serving cell to which the UE is connected last time.

Preferably, the step that the mobility management unit receives the LIPA connection releasing auxiliary information may include that:

when a wireless-side network element receives from the UE the identifier information of the serving cell to which the UE is connected last time, the wireless-side network element sends the identifier information to the mobility management unit;

or, when the wireless-side network element receives from the UE the identifier information of the serving cell to which the UE is connected last time, the wireless-side network element judges whether it is necessary to release the LIPA connection of the UE or not according to the identifier information of the serving cell to which the UE is connected last time, and indicates a judgment result to the mobility management unit through the LIPA connection releasing indication information;

or, the UE judges whether it is necessary to release own LIPA connection or not, and indicates a judgment result to the mobility management unit through the LIPA connection releasing indication information.

Preferably, the step that the wireless-side network element judges whether it is necessary to release the LIPA connection of the UE or not according to the identifier information of the serving cell to which the UE is connected last time may include that:

the wireless-side network element judges whether a cell currently accessed by the UE is the same as the serving cell to which the UE is connected last time or not according to the received identifier information of the serving cell to which the UE is connected last time, determines that it is unnecessary to release the LIPA connection of the UE if the two cells are the same, otherwise determines that it is necessary to release the LIPA connection of the UE;

or, the wireless-side network element judges whether a cell currently accessed by the UE and the serving cell to which the UE is connected last time belong to the same eNB or not according to the received identifier information of the serving cell to which the UE is connected last time, determines that it is unnecessary to release the LIPA connection of the UE if the two cells belong to the same eNB, otherwise determines that it is necessary to release the LIPA connection of the UE.

Preferably, the step that the UE judges whether it is necessary to release own LIPA connection or not may include that:

the UE judges whether a cell currently accessed by the UE is the same as the serving cell to which the UE is connected last time or not according to the identifier information of the serving cell to which the UE is connected last time, determines that it is unnecessary to release the LIPA connection of the UE if the two cells are the same, otherwise determines that it is necessary to release the LIPA connection of the UE;

or, the UE judges whether a cell currently accessed by the UE and the serving cell to which the UE is connected last time belong to the same eNB or not according to the identifier information of the serving cell to which the UE is connected last time, determines that it is unnecessary to release the LIPA connection of the UE if the two cells belong to the same eNB, otherwise determines that it is necessary to release the LIPA connection of the UE.

Preferably, the step that the mobility management unit executes a LIPA connection releasing check according to the received LIPA connection releasing auxiliary information may include that:

the mobility management unit executes the LIPA connection releasing check according to the LIPA connection releasing auxiliary information in a TAU or service request process.

Preferably, the step that the mobility management unit executes LIPA connection releasing check according to the received LIPA connection releasing auxiliary information may include that:

the mobility management unit judges whether a cell currently accessed by the UE is the same as the serving cell to which the UE is connected last time or not according to the received identifier information of the serving cell to which the UE is connected last time, and determines that it is unnecessary to release the LIPA connection of the UE if the two cells are same, otherwise determines that it is necessary to release the LIPA connection of the UE;

or, the mobility management unit judges whether a cell currently accessed by the UE and the serving cell to which the UE is connected last time belong to the same eNB or not according to the received identifier information of the serving cell to which the UE is connected last time, determines that it is unnecessary to release the LIPA connection of the UE if the two cells belong to the same eNB, otherwise determines that it is necessary to release the LIPA connection of the UE;

or, the mobility management unit determines that it is necessary to release the LIPA connection of the UE if determining that the received LIPA connection releasing indication information indicates to release the LIPA connection of the UE, and determines that it is unnecessary to release the LIPA connection of the UE if determining that the LIPA connection releasing indication information indicates not to release the LIPA connection of the UE;

or, the mobility management unit determines that it is necessary to release the LIPA connection of the UE if the mobility management unit does not receives the LIPA connection releasing auxiliary information within a set time period.

Preferably, after the mobility management unit executes LIPA connection releasing check according to the received LIPA connection releasing auxiliary information, the method further may include that:

the mobility management unit initiates a PDN disconnection process to release the LIPA connection of the UE when determining that it is necessary to release the LIPA connection of the UE.

Preferably, the LIPA connection releasing auxiliary information may be born in Non-Access Stratum (NAS) information for sending.

Preferably, the wireless-side network element may include at least one of network elements as follows: an RN, an MRN, a DeNB, an HeNB and an HeNB GW.

A method for releasing a LIPA is provided, which includes that:

a wireless-side network element executes LIPA connection releasing check according to received LIPA connection releasing auxiliary information, and judges whether to release a LIPA connection of UE or not.

Preferably, the LIPA connection releasing auxiliary information may include at least one piece of information as follows:

LIPA connection releasing indication information; and identifier information of a serving cell to which the UE is connected last time.

Preferably, the step that the wireless-side network element receives the LIPA connection releasing auxiliary information may include that:

the UE sends the identifier information of the serving cell to which the UE is connected last time to a mobility management unit through NAS information; and the mobility management unit sends the identifier information of the serving cell to which the UE is connected last time to the wireless-side network element when the mobility management unit executes a bearer establishment process;

or, the UE judges whether it is necessary to release own LIPA connection or not, and indicates a judgment result to the mobility management unit through the LIPA connection releasing indication information; and the mobility management unit indicates the judgement result to the wireless-side network element through the LIPA connection releasing indication information when the mobility management unit executes a bearer establishment process.

Preferably, the step that the wireless-side network element executes LIPA connection releasing check according to the received LIPA connection releasing auxiliary information may include that:

the wireless-side network element determines that the received LIPA connection releasing auxiliary information is the LIPA connection releasing indication information, the wireless-side network element determines to release the LIPA connection of the UE when the LIPA connection releasing indication information indicates to release the LIPA connection, and the wireless-side network element determines not to release the LIPA connection of the UE when the LIPA connection releasing indication information indicates not to release the LIPA connection;

or, the wireless-side network element determines that the received LIPA connection releasing auxiliary information is the identifier information of the serving cell to which the UE is connected last time, judges whether a cell currently accessed by the UE is the same as the serving cell to which the UE is connected last time or not according to the identifier information of the serving cell to which the UE is connected last time, and determines that it is unnecessary to release the LIPA connection of the UE if the two cells are the same, otherwise determines that it is necessary to release the LIPA connection of the UE;

or, the wireless-side network element judges whether the cell currently accessed by the UE and the serving cell to which the UE is connected last time belong to the same eNB or not according to the received identifier information of the serving cell to which the UE is connected last time, and determines that it is unnecessary to release the LIPA connection of the UE if the two cells belong to the same eNB, otherwise determines that it is necessary to release the LIPA connection of the UE;

or, the wireless-side network element determines that it is necessary to release the LIPA connection of the UE if the wireless-side network element does not receive the LIPA connection releasing auxiliary information within a set time period.

Preferably, after the wireless-side network element executes LIPA connection releasing check according to the received LIPA connection releasing auxiliary information, the method may further include that:

the wireless-side network element indicates a connected local GW to release the LIPA connection of the UE when the wireless-side network element determines that it is necessary to release the LIPA connection of the UE.

A device for releasing a LIPA connection is provided, which includes a receiving unit, an execution unit and a determination unit, wherein the receiving unit is configured to receive LIPA connection releasing auxiliary information;

the execution unit is configured to execute LIPA connection releasing check according to the LIPA connection releasing auxiliary information; and the determination unit is configured to determine whether to release a LIPA connection of UE or not.

Preferably, the LIPA connection releasing auxiliary information may include at least one piece of information as follows:

LIPA connection releasing indication information; and identifier information of a serving cell to which the UE is connected last time.

Preferably, the receiving unit may be further configured to receive from a wireless-side network element the identifier information of the serving cell to which the UE is connected last time, wherein the wireless-side network element receives the identifier information of the serving cell to which the UE is connected last time from the UE, and sends the identifier information to the receiving unit;

or, the receiving unit may be further configured to receive the LIPA connection releasing indication information sent by the wireless-side network element, wherein the wireless-side network element judges whether it is necessary to release the LIPA connection of the UE or not according to the identifier information of the serving cell to which the UE is connected last time when receiving from the UE the identifier information of the serving cell to which the UE is connected last time, and sends a judgment result to the receiving unit through the LIPA connection releasing indication information;

or, the receiving unit may be further configured to receive the LIPA connection releasing indication information sent by the UE, wherein the UE judges whether it is necessary to release own LIPA connection or not, and sends a judgment result to the receiving unit through the LIPA connection releasing indication information.

Preferably, the execution unit may be further configured to execute LIPA connection releasing check according to the LIPA connection releasing auxiliary information in a TAU or service request process.

Preferably, the determination unit may be further configured to judge whether a cell currently accessed by the UE is the same as the serving cell to which the UE is connected last time or not when the LIPA connection releasing indication information received by the receiving unit is the identifier information of the serving cell to which the UE is connected last time, and to determine that it is unnecessary to release the LIPA connection of the UE if the two cells are same, otherwise determine that it is necessary to release the LIPA connection of the UE;

or, the determination unit is further configured to judge whether a cell currently accessed by the UE and the serving cell to which the UE is connected last time belong to the same eNB or not when the LIPA connection releasing indication information received by the receiving unit is the identifier information of the serving cell to which the UE is connected last time, and to determine that it is unnecessary to release the LIPA connection of the UE if the two cells belong to the same eNB, otherwise determine that it is necessary to release the LIPA connection of the UE;

the determination unit may be further configured to determine that it is necessary to release the LIPA connection of the UE when determining that the LIPA connection releasing indication information received by the receiving unit indicates to release the LIPA connection of the UE, and to determine that it is unnecessary to release the LIPA connection of the UE when the LIPA connection releasing indication information indicates not to release the LIPA connection of the UE;

or, the determination unit may be further configured to determine that it is necessary to release the LIPA connection of the UE when determining that the receiving unit does not receive the LIPA connection releasing auxiliary information within a set time period.

Preferably, the device may further include:

a releasing unit, configured to initiate a PDN disconnection process to release the LIPA connection of the UE when the determination unit determines that it is necessary to release the LIPA connection of the UE.

Preferably, the receiving unit may be further configured to receive the identifier information, sent by a mobility management unit, of the serving cell to which the UE is connected last time, wherein the UE sends the identifier information of the serving cell to which the UE is connected last time to the mobility management unit through NAS information; and the mobility management unit may be configured to send the identifier information of the serving cell to which the UE is connected last time to the receiving unit when executing a bearer establishment process;

or, the receiving unit may be further configured to receive the LIPA connection releasing indication information sent by the UE, wherein the UE judges whether it is necessary to release own LIPA connection or not, and indicates a judgment result to the mobility management unit through the LIPA connection releasing indication information; and the mobility management unit indicates the judgement result to the receiving unit through the LIPA connection releasing indication information when executing the bearer establishment process.

Preferably, the determination unit may be further configured to determine that the LIPA connection releasing auxiliary information received by the receiving unit is the LIPA connection releasing indication information, to determine to release the LIPA connection of the UE when the LIPA connection releasing indication information indicates to release the LIPA connection, and determine not to release the LIPA connection of the UE when the LIPA connection releasing indication information indicates not to release the LIPA connection;

the determination unit may be further configured to judge whether a cell currently accessed by the UE is the same as the serving cell to which the UE is connected last time or not when the LIPA connection releasing auxiliary information received by the receiving unit is the identifier information of the serving cell to which the UE is connected last time, and to determine that it is unnecessary to release the LIPA connection of the UE if the two cells are the same, otherwise determine that it is necessary to release the LIPA connection of the UE;

or, the determination unit may be further configured to judge whether a cell currently accessed by the UE and the serving cell to which the UE is connected last time belong to the same eNB or not when determining that the LIPA connection releasing auxiliary information received by the receiving unit is the identifier information of the serving cell to which the UE is connected last time, and to determine that it is unnecessary to release the LIPA connection of the UE if the two cells belong to the same eNB, otherwise determine that it is necessary to release the LIPA connection of the UE;

or, the determination unit may be further configured to determine that it is necessary to release the LIPA connection of the UE when determining that the receiving unit does not receive the LIPA connection releasing auxiliary information within a set time period.

Preferably, the device may further include:

a releasing unit, configured to indicate a connected local GW to release the LIPA connection of the UE when the determination unit determines that it is necessary to release the LIPA connection of the UE.

A mobility management unit is provided, which includes the abovementioned device for releasing a LIPA connection.

A wireless-side network element is provided, which includes the abovementioned device for releasing a LIPA connection.

According to the present disclosure, the mobility management unit or the wireless-side network element executes LIP connection releasing check according to the received LIPA connection releasing auxiliary information, and judges whether to release the LIPA connection of the UE or not. The mobility management unit initiates a PDN disconnection process to release the LIPA connection of the UE when determining that it is necessary to release the LIPA connection of the UE; and the wireless-side network element directly indicates a connected local GW to release the LIPA connection of the UE when determining that it is necessary to release the LIPA connection of the UE. According to the technical solutions of the present disclosure, under the condition that a mobile relay supports LIPA, continuity of the LIPA connection of the UE in an MRN handover process is ensured, continuity of a LIPA service of the UE is further ensured, and the quality of service for a user and a user experience are improved.

DETAILED DESCRIPTION

In order to make clearer the purpose, technical solutions and advantages of the present disclosure, the present disclosure is further described below with reference to the embodiments and the drawings in detail.

Figure 1:
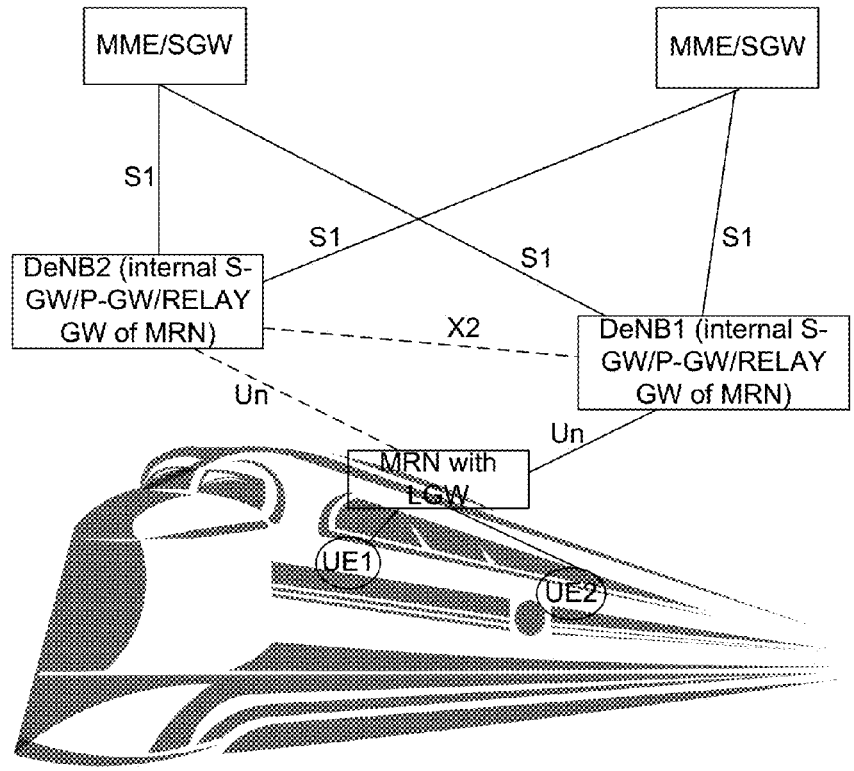
FIG. 1 is an architecture diagram of a mobile relay system supporting a LIPA function in a high-speed railway scenario.
Figure 2:
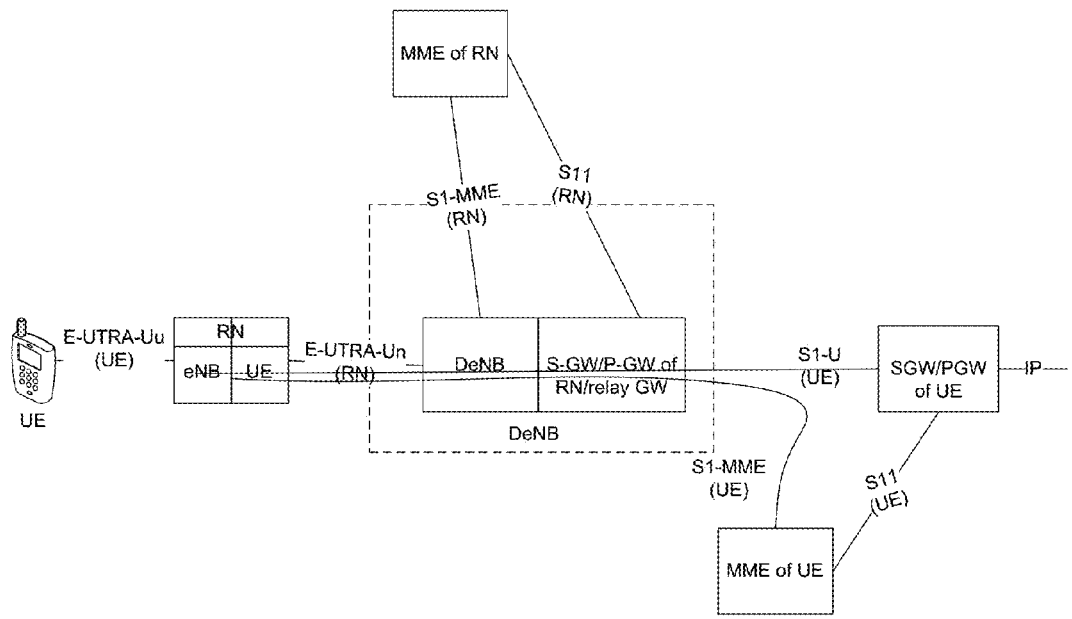
FIG. 2 is an architecture diagram of an R10 fix relay system.
Figure 3:
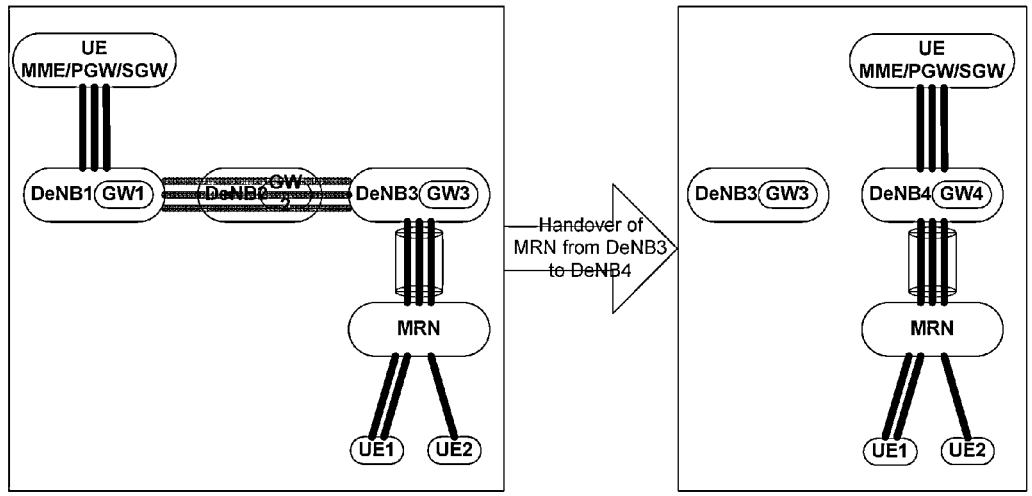
FIG. 3 is a diagram of a route optimization structure of a mobile relay adopting an R10 fix relay system architecture.
Figure 4:
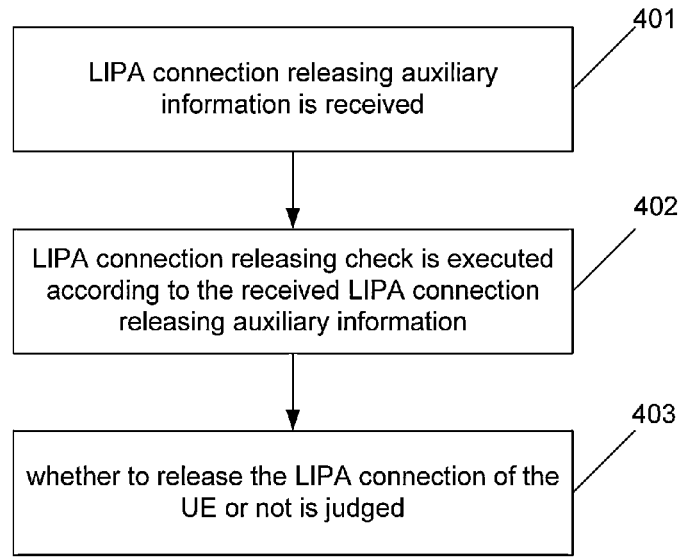
FIG. 4 is a flowchart of a method for releasing a LIPA connection according to the present disclosure.

FIG. 4 is a flowchart of a method for releasing a LIPA connection according to the present disclosure, and as shown in FIG. 4, the method for releasing a LIPA connection according to the present disclosure includes the following steps 401-403.

Step 401 includes that LIPA connection releasing auxiliary information is received.

In the present disclosure, the LIPA connection releasing auxiliary information includes at least one piece of information as follows: LIPA connection releasing indication information, and identifier information of a serving cell to which UE is connected last time, wherein the LIPA connection releasing auxiliary information is employed to indicate whether it is necessary to release the LIPA connection, i.e. a LIPA PDN connection, and the identifier information of the serving cell to which the UE is connected last time at least includes a cell identifier.

In the present disclosure, it is a mobility management unit or a wireless-side network element which receives the LIPA connection releasing auxiliary information for related processing, and descriptions thereof are respectively given below. The mobility management unit may be a mobility management entity (MME) or a Serving General Packet Radio Service Support Node (SGSN). The wireless-side network element may be at least one of an RN, an MRN, an HeNB, a DeNB, an HeNB GW and the like.

When the mobility management unit is an MME, the step that the MME receives the LIPA connection releasing auxiliary information includes that: the UE sends the identifier information of the serving cell to which the UE is connected last time to the wireless-side network element, and the wireless-side network element sends the identifier information of the serving cell to which the UE is connected last time to the MME; the wireless-side network element may send the identifier information of the serving cell to which the UE is connected last time to the MME through another network element; or, the UE sends the identifier information of the serving cell to which the UE is connected last time to the wireless-side network element, and the wireless-side network element judges whether it is necessary to release the LIPA PDN connection of the UE or not according to the identifier information of the serving cell to which the UE is connected last time, and then indicates a judgment result to the MME. If the wireless-side network element determines that it is necessary to release the LIPA PDN connection of the UE, the wireless-side network element sends the LIPA connection releasing indication information indicating that it is necessary to release the LIPA PDN connection to the MME, or implicitly indicates to the MME that it is necessary to release the LIPA PDN connection of the UE by not sending the LIPA connection releasing indication information. If the wireless-side network element determines that it is unnecessary to release the LIPA PDN connection of the UE, the wireless-side network element sends LIPA connection releasing indication information indicating that it is unnecessary to release the LIPA PDN connection to the MME. The wireless-side network element may send the LIPA connection releasing indication information to the MME through another network element; or, the UE judges whether it is necessary to release the LIPA PDN connection or not, and indicates a judgment result to the MME through the wireless-side network element. If the UE determines that it is necessary to release the LIPA PDN connection of the UE, the UE sends LIPA connection releasing indication information indicating that it is necessary to release the LIPA PDN connection to the MME, or implicitly indicates to the MME that it is necessary to release the LIPA PDN connection of the UE by not sending the LIPA connection releasing indication information. If the UE determines that it is unnecessary to release the LIPA PDN connection of the UE, the UE sends LIPA connection releasing indication information indicating that it is unnecessary to release the LIPA PDN connection to the MME.

The step that the wireless-side network element judges whether it is necessary to release the LIPA PDN connection of the UE or not according to the identifier information of the serving cell to which the UE is connected last time includes that: the wireless-side network element judges whether a currently accessed cell is the same as the serving cell to which the UE is connected last time or not according to the identifier information of the serving cell to which the UE is connected last time, determines that it is unnecessary to release the LIPA PDN connection of the UE if the two cells are the same, otherwise determines that it is necessary to release the LIPA PDN connection of the UE; or, the wireless-side network element judges whether the currently accessed cell and the serving cell to which the UE is connected last time belong to the same eNB or not according to the identifier information of the serving cell to which the UE is connected last time, and determines that it is unnec-essary to release the LIPA PDN connection of the UE if the two cells belong to the same eNB, otherwise determines that it is necessary to release the LIPA PDN connection of the UE.

The step that the UE judges whether it is necessary to release the LIPA PDN connection or not includes that: the UE judges whether the currently accessed cell is the same as the serving cell to which the UE is connected last time or not according to the identifier information of the serving cell to which the UE is connected last time, and determines that it is unnecessary to release the LIPA PDN connection of the UE if the two cells are the same, otherwise determines that it is necessary to release the LIPA PDN connection of the UE; or, the UE judges whether the currently accessed cell and the serving cell to which the UE is connected last time belong to the same eNB or not according to the identifier information of the serving cell to which the UE is connected last time, and determines that it is unnecessary to release the LIPA PDN connection of the UE if the two cells belong to the same eNB, otherwise determines that it is necessary to release the LIPA PDN connection of the UE.

In the present disclosure, when it is the wireless-side network element which receives the LIPA connection releasing auxiliary information for related processing, the step that the wireless-side network element receives the LIPA connection releasing auxiliary information includes that: the UE sends the identifier information of the serving cell to which the UE is connected last time to a mobility management unit through NAS information, and the MME sends the identifier information of the serving cell to which the UE is connected last time to the wireless-side network element in a bearer establishment process if the MME subsequently executes a bearer establishment process; or, the UE judges whether it is necessary to release a LIPA PDN connection or not, and indicates a judgment result to the MME. If the UE determines that it is necessary to release the LIPA PDN connection of the UE, the UE sends the LIPA connection releasing indication information indicating that it is necessary to release the LIPA PDN connection to the MME through the NAS information, or does not send LIPA connection releasing indication information so as to implicitly indicate to the MME that it is necessary to release the LIPA connection. If the UE determines that is unnecessary to release the LIPA PDN connection of the UE, the UE sends LIPA connection releasing indication information indicating that it is unnecessary to release the LIPA PDN connection to the MME through the NAS information. If the MME subsequently executes a bearer establishment process, the MME sends the received LIPA connection releasing indication information to the wireless-side network element in the bearer establishment process.

Step 402 includes that LIPA connection releasing check is executed according to the received LIPA connection releasing auxiliary information.

When a main body executing LIPA connection releasing check is the MME, the step that the MME executes LIPA connection releasing check is implemented as follows: if the UE has the LIPA PDN connection, the LIPA connection releasing auxiliary information received by the MME is LIPA connection releasing indication information and the LIPA connection releasing indication information indicates that it is necessary to release the LIPA PDN connection, the MME determines to release the LIPA PDN connection of the UE; if the UE has the LIPA PDN connection, the LIPA connection releasing auxiliary information received by the MME is LIPA connection releasing indication information and the LIPA connection releasing indication information indicates that it is unnecessary to release the LIPA PDN connection, the MME determines not to release the LIPA PDN connection of the UE; if the UE has the LIPA PDN connection and the LIPA connection releasing auxiliary information received by the MME is the identifier information of the serving cell to which the UE is connected last time, the MME judges whether it is necessary to release the LIPA PDN connection or not; if it is necessary to release, the MME determines to release the LIPA PDN connection of the UE, otherwise, the LIPA PDN connection of the UE is determined not to be released; and if the UE has the LIPA PDN connection and the MME does not receive the LIPA connection releasing auxiliary information within a set time period, that is, it is implicitly indicated that it is necessary to release the LIPA PDN connection, the MME determines to release the LIPA PDN connection of the UE.

Specifically, the MME executes the LIPA connection releasing check according to the LIPA connection releasing auxiliary information in a TAU or service request process.

When the main body executing the LIPA connection releasing check is the wireless-side network element, the step that the wireless-side network element executes the LIPA connection releasing check is implemented as follows: if the UE has the LIPA PDN connection, the LIPA connection releasing auxiliary information received by the wireless-side network element is LIPA connection releasing indication information and the LIPA connection releasing indication information indicates that it is necessary to release the LIPA PDN connection, the wireless-side network element determines to release the LIPA PDN connection of the UE; if the UE has the LIPA PDN connection, the LIPA connection releasing auxiliary information received by the wireless-side network element is LIPA connection releasing indication information and the LIPA connection releasing indication information indicates that it is unnecessary to release the LIPA PDN connection, the wireless-side network element determines not to release the LIPA PDN connection of the UE; if the UE has the LIPA PDN connection and the LIPA connection releasing auxiliary information received by the wireless-side network element is the identifier information of the serving cell to which the UE is connected last time, the wireless-side network element judges whether it is necessary to release the LIPA PDN connection or not; if it is necessary to release, the wireless-side network element determines to release the LIPA PDN connection of the UE, otherwise, the LIPA PDN connection of the UE is determined not to be released; and if the UE has the LIPA PDN connection and the wireless-side network element does not receive the LIPA connection releasing auxiliary information, that is, it is implicitly indicated that it is necessary to release the LIPA PDN connection, the wireless-side network element determines to release the LIPA PDN connection of the UE.

Step 403 includes that whether to release the LIPA connection of the UE or not is determined.

The step that the MME judges whether it is necessary to release the LIPA PDN connection of the UE or not includes that: the MME judges whether the cell currently accessed by the UE is the same as the serving cell to which the UE is connected last time or not according to the identifier information of the serving cell to which the UE is connected last time, determines that it is unnecessary to release the LIPA PDN connection of the UE if the two cells are the same, otherwise determines that it is necessary to release the LIPA PDN connection of the UE; or, the MME judges whether the cell currently accessed by the UE and the serving cell to which the UE is connected last time belong to the same eNB or not according to the identifier information of the serving cell to which the UE is connected last time, determines that it is unnecessary to release the LIPA PDN connection of the UE if the two cells belong to the same eNB, otherwise determines that it is necessary to release the LIPA PDN connection of the UE.

After the MME executes the LIPA connection releasing check according to the LIPA connection releasing auxiliary information, the method further includes that:

the MME initiates a PDN disconnection process to release the LIPA PDN connection of the UE when determining to release the LIPA PDN connection of the UE.

After the wireless-side network element executes the LIPA connection releasing check according to the LIPA connection releasing auxiliary information, the method further includes that the wireless-side network element indicates a connected local GW to release the LIPA PDN connection of the UE when determining to release the LIPA PDN connection of the UE.

In the present disclosure, the LIPA connection releasing auxiliary information is born in a Non-Access Stratum (NAS) message for transmission.

Method Embodiment 1

Figure 5:
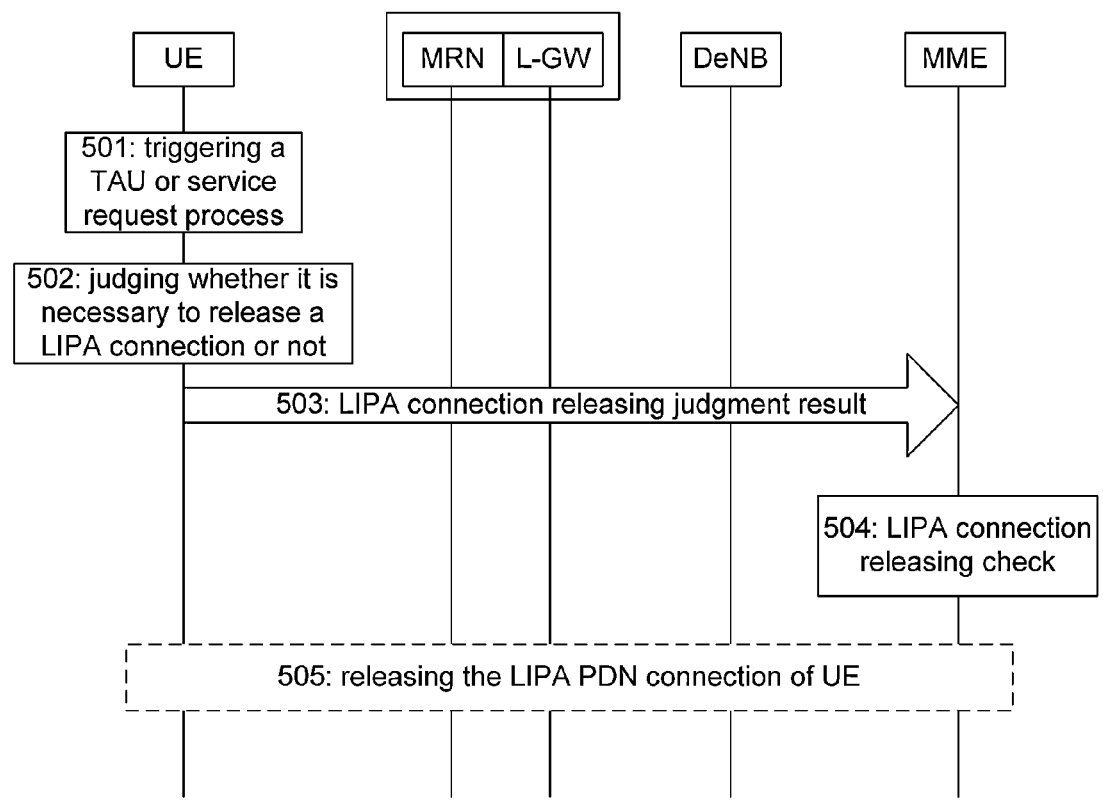
FIG. 5 is a flowchart of a method for releasing a LIPA connection according to embodiment 1 of the present disclosure.

The embodiment describes a method for executing a LIPA connection releasing check by an MME after UE judges whether it is necessary to release a LIPA connection or not and then indicates a judgment result about whether to release LIPA connection to the MME. FIG. 5 is a flowchart of a method for releasing a LIPA connection according to embodiment 1 of the present disclosure, and as shown in FIG. 5, the method for releasing the LIPA in the embodiment includes the following steps 501-505.

Step 501 includes that the UE triggers a TAU or service request process.

Step 502 includes that the UE judges whether it is necessary to release the LIPA connection or not, wherein the UE can make a judgment on the basis of criterions as follows:

1) the UE compares cell identifiers (for example, Evolved-Universal Terrestrial Radio Access Network Cell Global Identifiers (ECGI)) of a cell that the UE currently is accessing and a serving cell to which the UE is connected last time to judge whether the two cells are the same cell or not, and determines that it is unnecessary to release the LIPA PDN connection if they are same, otherwise determines that it is necessary to release the LIPA PDN connection; and 2) the UE compares the cell identifiers (for example, ECGIs) of a cell that the UE currently is accessing and a serving cell to which the UE is connected last time to judge whether the two cells belong to the same eNB or not, determines that it is unnecessary to release the LIPA PDN connection if they belong to the same eNB, otherwise determines that it is necessary to release the LIPA PDN connection.

Step 503 includes that the UE indicates a LIPA connection releasing judgment result to the MME, such indication including explicit indication and implicit indication. If the UE determines that it is necessary to release the LIPA PDN connection, the UE sends LIPA connection releasing indication information indicating that it is necessary to release the LIPA PDN connection to the MME through NAS information, or implicitly indicates to the MME that it is necessary to release by not sending the LIPA connection releasing indication information. If the UE determines that it is unnecessary to release the LIPA PDN connection, the UE sends LIPA connection releasing indication information indicating that it is unnecessary to release the LIPA PDN connection to the MME through NAS information.

Step 504 includes that the MME performs a LIPA connection releasing check according to the LIPA connection releasing judgment result indicated by the UE, wherein there are several conditions as follows:

1) if the UE has the LIPA PDN connection, the LIPA connection releasing auxiliary information received by the MME is LIPA connection releasing indication information and the LIPA connection releasing indication information indicates that it is necessary to release the LIPA PDN connection, the MME determines to release the LIPA PDN connection of the UE;

2) if the UE has the LIPA PDN connection, the LIPA connection releasing auxiliary information received by the MME is LIPA connection releasing indication information and the LIPA connection releasing indication information indicates that it is unnecessary to release the LIPA PDN connection, the MME determines not to release the LIPA PDN connection of the UE; and 3) if the UE has the LIPA PDN connection and the MME does not receive the LIPA connection releasing auxiliary information, that is, it is implicitly indicated that it is necessary to release the LIPA PDN connection, the MME determines to release the LIPA PDN connection of the UE.

Step 505 includes that the MME initiates a PDN disconnection process to release the LIPA PDN connection of the UE when determining to release the LIPA PDN connection of the UE.

If the method in embodiment 1 is adopted, each message flow in each specific scenario is respectively described in the following examples.

Example 1

Figure 10:
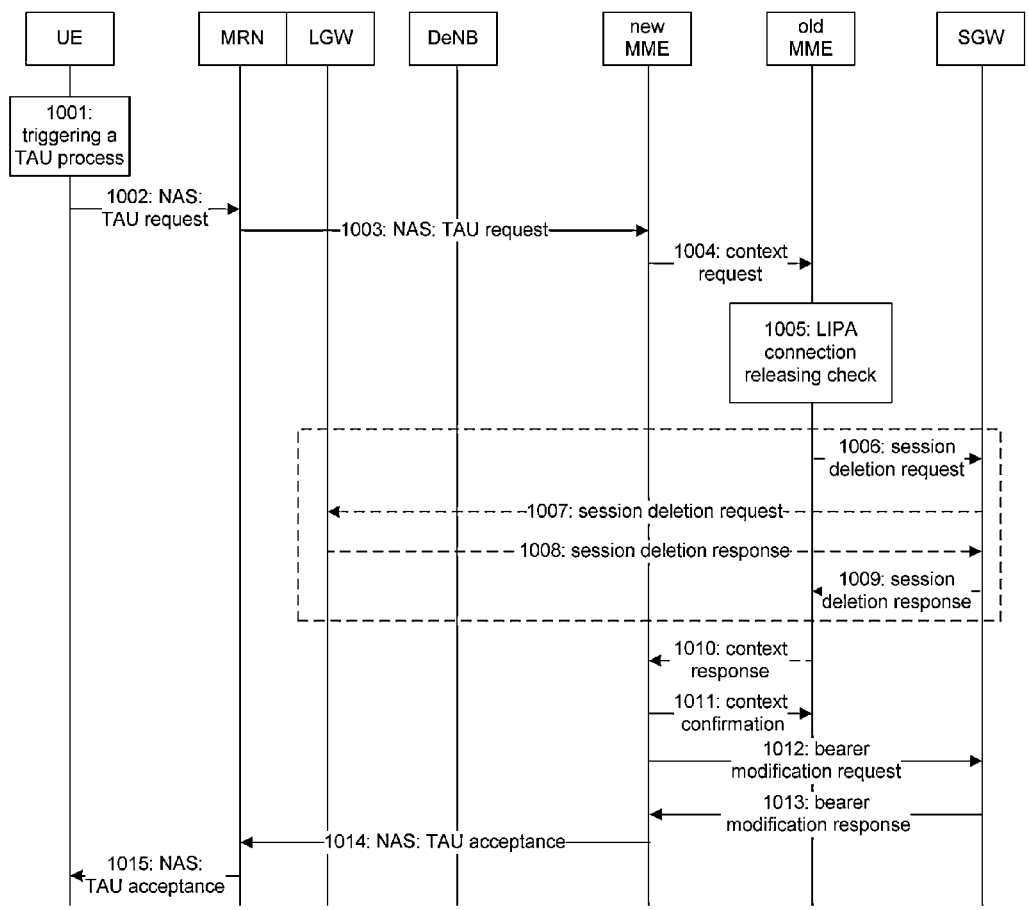
FIG. 10 is a flowchart of example 1 according to the present disclosure.

The example describes a flow of executing a LIPA connection releasing check by the MME in a TAU process, as shown in FIG. 10.

Step 1001 includes that the UE triggers a TAU process, for example, IDLE UE detects that a Tracking Area Identity (TAI) of a cell where it resides is not included in a TAI list configured for it by the MME or detects timeout of a TAU timer.

Step 1002 includes that the IDLE UE needs to be synchronized with and establish a Radio Resource Control (RRC) connection with the MRN, and then sends an RRC message containing an TAU request for NAS information to the MRN. The RRC message is an RRC establishment completion message or an uplink information transmission message. The UE needs to judge whether it is necessary to release the LIPA PDN connection or not before sending the message, and specific judgment criterions have been described in Step 502 in detail. The UE indicates the LIPA connection releasing judgment result to the MME after judgment is finished. Specifically, LIPA connection releasing indication information may be included in NAS information, or not included in the NAS information.

Step 1003 includes that the MRN determines an MME (called a new MME) according to MME identifier information in the received RRC message and a selected Public Land Mobile Network (PLMN), then sends the received TAU request for NAS information to the new MME through an S1 interface message, and sends the received LIPA connection releasing indication information to the MME through the S1 interface message. Specifically, the LIPA connection releasing indication information may be included in the NAS information, or not included in the NAS information. Because of an S1 proxy function of a DeNB, the S1 interface message needs to arrive at the MME through the DeNB. The S1 interface message may be an initial user message or an uplink NAS transmission message.

Step 1004 includes that the new MME obtains an address of the old MME according to a Globally Unique Temporary Identity (GUTI) received from the UE, and sends a context request message to the old MME to acquire user information of the UE. If the new MME receives the LIPA connection releasing indication information, the new MME sends the LIPA connection releasing indication information to the old MME through the context request message.

Step 1005 includes that the old MME performs a LIPA connection releasing check, specifically as described in Step 504.

Step 1006 includes that if the old MME determines to release the LIPA PDN connection of the UE, the old MME initiates a PDN disconnection process, and sends a session deletion request message to an SGW of the UE to request for deleting the LIPA PDN connection, the message including a Linked EPS Bearer Identifier (LBI) for identifying the PDN connection to be deleted.

Step 1007 includes that the SGW sends the session deletion request message to a PGW (for the LIPA PDN connection, the PGW is an LGW).

Step 1008 includes that the LGW sends a session deletion response message to the SGW after releasing the LIPA PDN connection.

Step 1009 includes that the SGW sends the session deletion response message to the old MME to confirm that the LIPA PDN connection is completely released.

Step 1010 includes that the old MME sends a context response message to the new MME to transmit UE context information stored by the old MME.

Step 1011 includes that the new MME sends a context confirmation message to the old MME.

Step 1012 includes that in the example, the SGW of the UE is not relocated. Then the new MME sends a bearer modification request message to the SGW of the UE to update S11 control plane information, such as an IP address of a GPRS Tunneling Protocol for Control plane (GTP-C) tunnel, a Tunnel Endpoint Identifier (TEID) and so on.

Step 1013 includes that the SGW of the UE sends a bearer modification response message to the new MME.

Step 1014 includes that the new MME of the UE sends an S1 message to the MRN, wherein the S1 message includes Information about acceptance of NAS information by TAU, and may be a downlink NAS transmission message or an initial context establishment request message or an Evolved Radio Access Bearer (E-RAB) establishment request message. If the UE sets "active flag" in the TAU request, the MME performs bearer establishment for the UE at this time. Because of the S1 proxy function of the DeNB, the S1 message is sent to the MRN after passing through the DeNB.

Step 1015 includes that the MRN sends the Information about acceptance of NAS information by TAU to the UE through an RRC message.

Example 2

Figure 11:
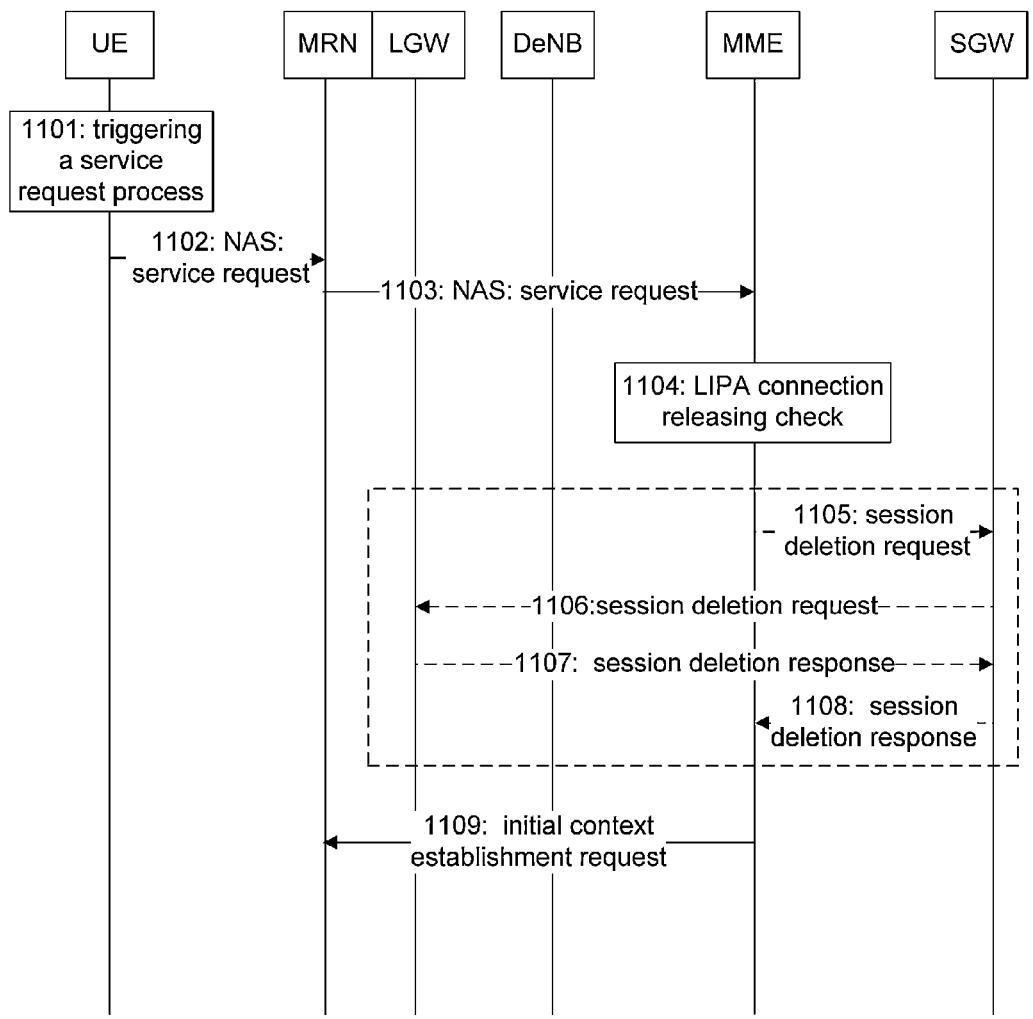
FIG. 11 is a flowchart of example 2 according to the present disclosure.

The example describes a flow of executing a LIPA connection releasing check by an MME in the service request process, as shown in FIG. 11.

Step 1101 includes that UE triggers a service process, for example, receiving paging for the UE.

Step 1102 includes that the UE needs to be synchronized with and establish an RRC connection with an MRN, and then sends an RRC message containing an NAS information service request to the MRN. The RRC message is an RRC establishment completion message or an uplink information transmission message. The UE needs to judge whether it is necessary to release a LIPA PDN connection or not before sending the message, and specific judgment criterions have been described in Step 502 in detail. The UE indicates a LIPA connection releasing judgment result to the MME after judgment is finished. Specifically, LIPA connection releasing indication information may be included in NAS information, or not included in the NAS information.

Step 1103 includes that the MRN sends the received NAS information service request through an S1 interface message to an MME indicated in the RRC message by the UE, and sends the received LIPA connection releasing indication information to the MME through the S1 interface message. Specifically, the LIPA connection releasing indication information may be included in the NAS information, or not included in the NAS information. Because of an S1 proxy function of a DeNB, the S1 interface message needs to arrive at the MME after passing through the DeNB. The S1 interface message may be an initial user message or an uplink NAS transmission message.

Step 1104-Step 1108 are the same as Step 1005-Step 1009, and will not be repeated here.

Step 1109 includes that the MME sends an initial context establishment request to the MRN to carry out a bearer establishment process for the UE. The message is sent to the MRN after passing through the DeNB.

Method Embodiment 2

Figure 6:
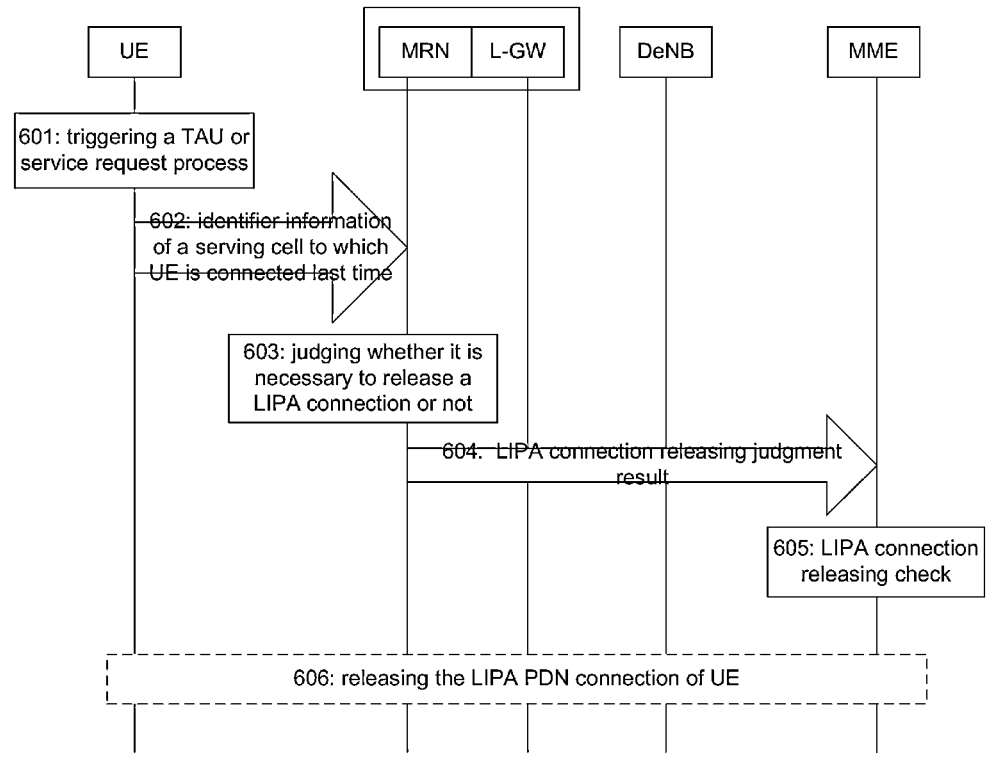
FIG. 6 is a flowchart of a method for releasing a LIPA connection according to embodiment 2 of the present disclosure.

The embodiment describes a method that UE sends identifier information of a serving cell to which the UE is connected last time to an MRN, the MRN indicates a LIPA connection releasing judgment result to an MME after judging whether it is necessary to release a LIPA connection or not, and the MME executes a LIPA connection releasing check. FIG. 6 is a flowchart of a method for releasing a LIPA connection according to embodiment 2 of the present disclosure, and as shown in FIG. 6, the method for releasing the LIPA connection according to the embodiment includes the following steps 601-606.

Step 601 includes that the UE triggers a TAU or service request process.

Step 602 includes that the UE sends the identifier information of the serving cell to which the UE is connected last time to the MRN.

Step 603 includes that the MRN judges whether it is necessary to release a LIPA PDN connection of the UE or not according to the received identifier information of the serving cell to which the UE is connected last time, wherein the MRN can make a judgment on the basis of criterions as follows:

1) the MRN compares cell identifiers (for example, ECGIs) of a cell currently accessed by the UE and the serving cell to which the UE is connected last time to judge whether the two cells are the same cell or not, determines that it is unnecessary to release the LIPA PDN connection if they are same, otherwise determines that it is necessary to release the LIPA PDN connection; and 2) the MRN compares the cell identifiers (for example, ECGIs) of the cell currently accessed by the UE and the serving cell to which the UE is connected last time to judge whether the two cells belong to the same eNB or not, determines that it is unnecessary to release the LIPA PDN connection if they belong to the same eNB, otherwise determines that it is necessary to release the LIPA PDN connection.

Step 604 includes that the MRN indicates a LIPA connection releasing judgment result to the MME, such indication including explicit indication and implicit indication. If the MRN determines that it is necessary to release the LIPA PDN connection, the MRN sends LIPA connection releasing indication information indicating that it is necessary to release the LIPA PDN connection to the MME, or does not send the LIPA connection releasing indication information so as to implicitly indicate to the MME that it is necessary to release. If the MRN determines that it is unnecessary to release the LIPA PDN connection, the MRN sends LIPA connection releasing indication information indicating that it is unnecessary to release the LIPA PDN connection to the MME.

Step 605 includes that the MME performs a LIPA connection releasing check according to the LIPA connection releasing judgment result indicated by the MRN, wherein there are several conditions as follows:

1) if the UE has the LIPA PDN connection, the LIPA connection releasing auxiliary information received by the MME is LIPA connection releasing indication information and the LIPA connection releasing indication information indicates that it is necessary to release the LIPA PDN connection, then the MME determines to release the LIPA PDN connection of the UE;

2) if the UE has the LIPA PDN connection, the LIPA connection releasing auxiliary information received by the MME is LIPA connection releasing indication information and the LIPA connection releasing indication information indicates that it is unnecessary to release the LIPA PDN connection, then the MME determines not to release the LIPA PDN connection of the UE; and 3) if the UE has the LIPA PDN connection and the MME does not receive LIPA connection releasing auxiliary information, that is, it is implicitly indicated that it is necessary to release the LIPA PDN connection, then the MME determines to release the LIPA PDN connection of the UE.

Step 606 includes that the MME initiates a PDN disconnection process to release the LIPA PDN connection of the UE when determining to release the LIPA PDN connection of the UE.

When the method in embodiment 2 is adopted, each message flow in specific scenarios is described in the following examples.

Example 3

Example 3 describes a flow of executing a LIPA connection releasing check by the MME in a TAU process, as shown in FIG. 10.

Compared with example 1, the example has the difference that the UE is not required to judge whether it is necessary to release a LIPA PDN connection or not while the MRN makes such judgment. Specific differences are as follows:

1) the RRC message in Step 1002 contains the identifier information of the serving cell to which the UE is connected last time; and 2) in Step 1003, the MRN judges whether it is necessary to release a LIPA PDN connection or not before sending NAS information, and indicates the judgment result to the MME after judgment is finished. Specific details have been described in Step 503.

Example 4

Example 4 describes a flow of executing a LIPA connection releasing check by the MME in a service request process, as shown in FIG. 11.

Compared with example 2, the example has the difference that the UE is not required to judge whether it is necessary to release a LIPA PDN connection or not while the MRN makes such judgment. Specific differences are similar to those described in example 3, which are as follows:

1) the RRC message in Step 1102 contains the identifier information of the serving cell to which the UE is connected last time; and 2) in Step 1103, the MRN judges whether it is necessary to release the LIPA PDN connection or not before sending the NAS information, and indicates a judgment result to the MME after judgment is finished. Specific details have been described in Step 503.

Method Embodiment 3

Figure 7:
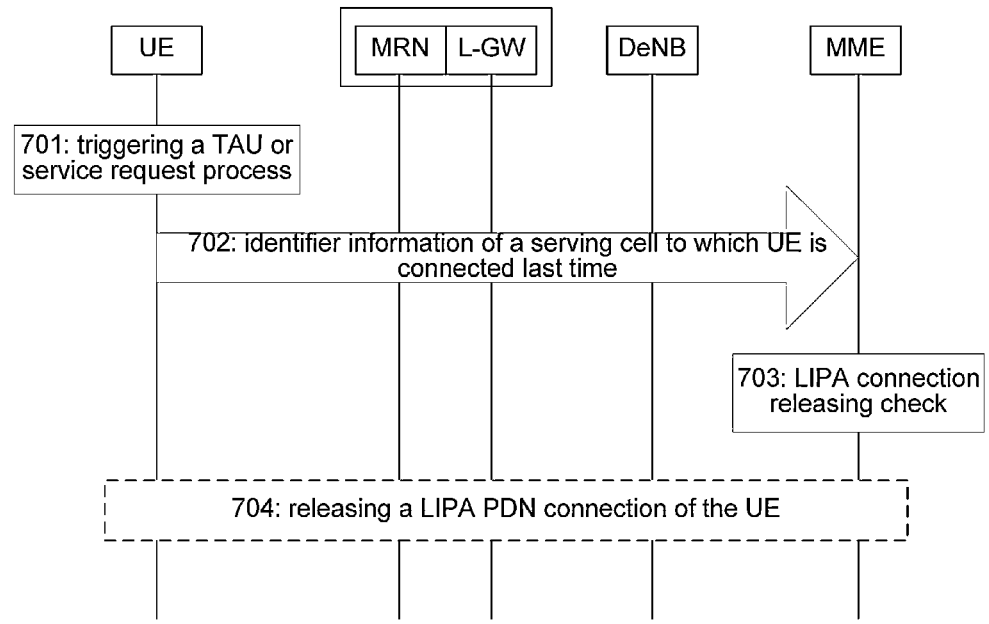
FIG. 7 is a flowchart of a method for releasing a LIPA connection according to embodiment 3 of the present disclosure.

The embodiment describes a method that UE sends identifier information of a serving to which the UE is connected last time to an MME and the MME executes a LIPA connection releasing check. FIG. 7 is a flowchart of a method for releasing a LIPA connection according to embodiment 3 of the present disclosure, and as shown in FIG. 7, the method for releasing a LIPA connection according to the embodiment includes the following steps 701-704.

Step 701 includes that the UE triggers a TAU or service request process.

Step 702 includes that the UE sends the identifier information of the serving cell to which the UE is connected last time to the MME.

Step 703 includes that if the UE has the LIPA PDN connection, the MME judges whether it is necessary to release the LIPA PDN connection of the UE or not according to the received identifier information of the serving cell to which the UE is connected last time, wherein the MME can make a judgment on the basis of criterions as follows:

1) the MME compares cell identifiers (for example, ECGIs) of a cell currently accessed by the UE and the serving cell to which the UE is connected last time to judge whether the two cells are the same cell or not, determines that it is unnecessary to release the LIPA PDN connection if they are the same, otherwise determines that it is necessary to release the LIPA PDN connection; and 2) the MME compares the cell identifiers (for example, ECGIs) of the cell currently accessed by the UE and the serving cell to which the UE is connected last time to judge whether the two cells belong to the same eNB or not, determines that it is unnecessary to release the LIPA PDN connection if they belong to the same eNB, otherwise determines that it is necessary to release the LIPA PDN connection.

Then, the MME executes a LIPA connection releasing check according to a LIPA connection releasing judgment result, wherein there are several conditions as follows:

1) if the MME determines that it is necessary to release the LIPA PDN connection of the UE, the MME determines to release the LIPA PDN connection of the UE; and 2) if the MME determines that it is unnecessary to release the LIPA PDN connection of the UE, the MME determines not to release the LIPA PDN connection of the UE.

Step 704 includes that if the MME determines to release the LIPA PDN connection of the UE, the MME initiates a PDN disconnection process to release the LIPA PDN connection of the UE.

When the method in embodiment 3 is adopted, each message flow in specific scenarios is described in the following examples.

Example 5

Example 5 describes a flow of executing a LIPA connection releasing check by the MME in a TAU process, as shown in FIG. 10.

Compared with example 1, the example has the difference that the UE is not required to judge whether it is necessary to release the LIPA PDN connection or not while the MMEN makes such judgment. Specific differences are as follows:

1) the RRC message in Step 1002 contains the identifier information of the serving cell to which the UE is connected last time;

2) the S1 interface message in Step 1003 contains the identifier of the serving cell to which the UE is connected last time;

3) the context request message in Step 1004 contains the identifier information of the serving cell to which the UE is connected last time; and 4) the old MME is required to judge whether it is necessary to release the LIPA PDN connection of the UE or not according to the identifier information of the serving cell to which the UE is connected last time when performing the LIPA connection releasing check. Specific details have been described in Step 703.

Example 6

Example 6 describes a flow of executing a LIPA connection releasing check by the MME in a service request process, as shown in FIG. 11.

Compared with example 2, the example has the difference that the UE is not required to judge whether it is necessary to release the LIPA PDN connection or not while the MME makes such judgment. Specific differences are as follows:

1) the RRC message in Step 1102 contains the identifier information of the serving cell to which the UE is connected last time;

2) the S1 interface message in Step 1103 contains the identifier of the serving cell to which the UE is connected last time; and 3) the MME is required to judge whether it is necessary to release the LIPA PDN connection of the UE or not according to the identifier information of the serving cell to which the UE is connected last time when performing the LIPA connection releasing check. Specific details have been described in Step 603.

Method Embodiment 4

Figure 8:
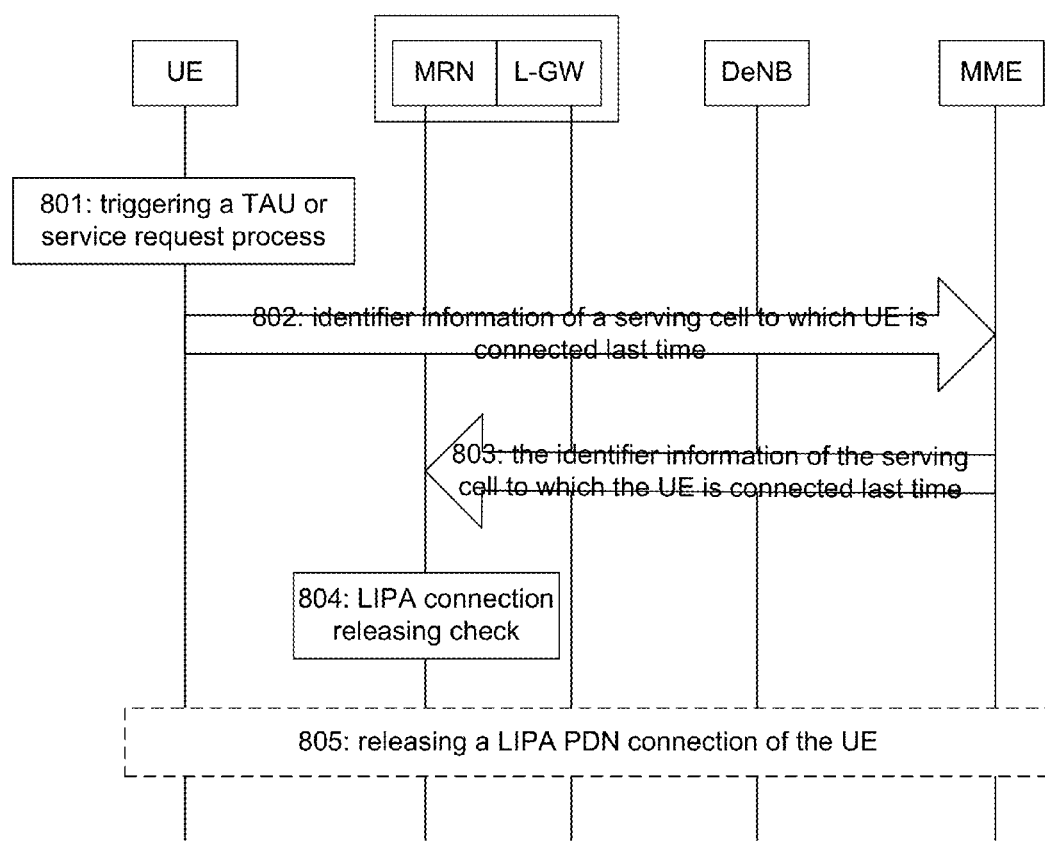
FIG. 8 is a flowchart of a method for releasing a LIPA connection according to embodiment 4 of the present disclosure.

The embodiment describes a method that UE sends identifier information of a serving cell to which the UE is connected last time to an MME, the MME sends the identifier information to an MRN during bearer establishment and the MRN executes a LIPA connection releasing check. FIG. 8 is a flowchart of a method for releasing a LIPA connection according to embodiment 4 of the present disclosure, and as shown in FIG. 8, the method for releasing a LIPA connection according to the embodiment includes the following steps 801-805.

Step 801 includes that the UE triggers a TAU or service request process.

Step 802 includes that the UE judges whether it is necessary to release the LIPA PDN connection or not, wherein the UE can make a judgment on the basis of criterions as follows:

1) the UE compares cell identifiers (for example, ECGIs) of a cell currently accessed by the UE and a serving cell to which the UE is connected last time to judge whether the two cells are the same cell or not, determines that it is unnecessary to release the LIPA PDN connection if they are the same, otherwise determines that it is necessary to release the LIPA PDN connection; and 2) the UE compares the cell identifiers (for example, ECGIs) of a cell currently accessed by the UE and the serving cell to which the UE is connected last time to judge whether the two cells belong to the same eNB or not, determines that it is unnecessary to release the LIPA PDN connection if they belong to the same eNB, otherwise determines that it is necessary to release the LIPA PDN connection.

Step 803 includes that the UE indicates a LIPA connection releasing judgment result to the MME, such indication including explicit indication and implicit indication. If the UE determines that it is necessary to release the LIPA PDN connection, the UE sends LIPA connection releasing indication information indicating that it is necessary to release the LIPA PDN connection to the MME through NAS information, or implicitly indicates to the MME that it is necessary to release by not sending LIPA connection releasing indication information. If the UE determines that it is unnecessary to release the LIPA PDN connection, the UE sends LIPA connection releasing indication information indicating that it is unnecessary to release the LIPA PDN connection to the MME through NAS information.

Step 804 includes that if the MME subsequently initiates a bearer establishment process for the UE, the MME indicates the LIPA connection releasing judgment result indicated by the UE to the MRN in the bearer establishment process, such indication similarly including explicit indication and implicit indication.

Step 805 includes that if the UE has the LIPA PDN connection, then the MRN judges whether it is necessary to release the LIPA PDN connection of the UE or not according to received identifier information of the serving cell to which the UE is connected last time, wherein the MRN can make a judgment on the basis of criterions as follows:

1) the MRN compares cell identifiers (for example, ECGIs) of a cell currently accessed by the UE and the serving cell to which the UE is connected last time to judge whether the two cells are the same cell or not, determines that it is unnecessary to release the LIPA PDN connection if they are the same, otherwise determines that it is necessary to release the LIPA PDN connection; and 2) the MRN compares the cell identifiers (for example, ECGIs) of the cell currently accessed by the UE and the serving cell to which the UE is connected last time to judge whether the two cells belong to the same eNB or not, determines that it is unnecessary to release the LIPA PDN connection if they belong to the same eNB, otherwise determines that it is necessary to release the LIPA PDN connection.

Then, the MRN executes a LIPA connection releasing check according to the LIPA connection releasing judgment result, wherein there are several conditions as follows:

1) if the UE has the LIPA PDN connection and the MRN determines that it is necessary to release the LIPA PDN connection of the UE, then the MRN determines to release the LIPA PDN connection of the UE; and 2) if the UE has the LIPA PDN connection and the MRN determines that it is unnecessary to release the LIPA PDN connection of the UE, then the MRN determines not to release the LIPA PDN connection of the UE.

Step 805 includes that if the MRN determines to release the LIPA PDN connection of the UE, then the MRN indicates a connected local GW to release the LIPA PDN connection of the UE.

When the method in embodiment 4 is adopted, each message flow in specific scenarios is described in the following examples.

Example 7

Figure 12:
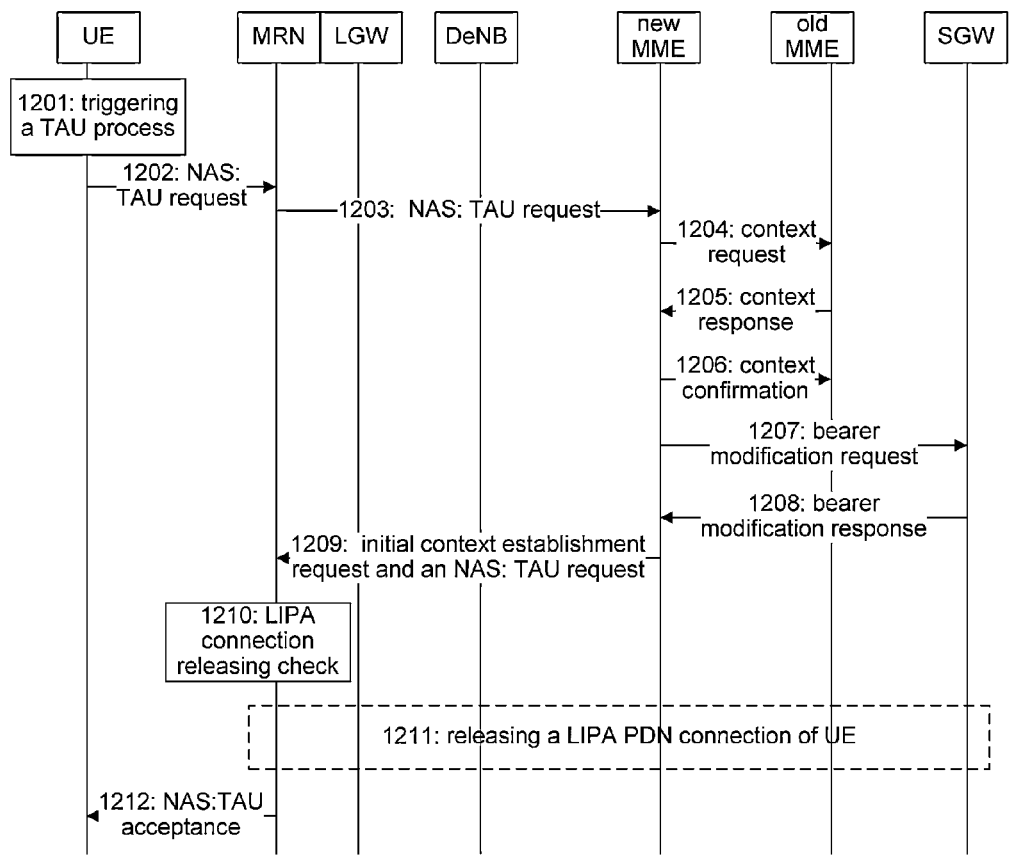
FIG. 12 is a flowchart of example 3 according to the present disclosure.

The example describes a flow of executing a LIPA connection releasing check by the MRN in the TAU process, as shown in FIG. 12.

Step 1201 includes that the UE triggers a TAU process, for example, IDLE UE detects that a TAI of a cell where it resides is not included in a TAI list configured for the IDLE UE by the MME or detects timeout of a TAU timer.

Step 1202 includes that the IDLE UE needs to be synchronized with and establish an RRC connection with the MRN, and then sends an RRC message containing an TAU request for NAS information to the MRN. The RRC message is an RRC establishment completion message or an uplink information transmission message. The UE needs to send the identifier of the serving cell to which the UE is connected last time to the MME. Specifically, the identifier information of the serving cell to which the UE is connected last time may be included in NAS information, or not included in the NAS information.

Step 1203 includes that the MRN determines an MME (called a new MME) according to MME identifier information in the received RRC message and a selected PLMN, then sends the received TAU request for NAS information to the new MME through an S1 interface message, and sends the received identifier information of the serving cell to which the UE is connected last time to the MME through the S1 interface message. Specifically, the identifier information of the serving cell to which the UE is connected last time may be included in the NAS information or not included in the NAS information. Because of an S1 proxy function of a DeNB, the S1 interface message needs to arrive at the MME after passing through the DeNB. The S1 interface message may be an initial user message or an uplink NAS transmission message.

Step 1204 includes that the new MME obtains an address of the old MME according to a GUTI received from the UE, and sends a context request message to the old MME to acquire user information of the UE.

Step 1205 includes that the old MME sends a context response message to the new MME to transmit UE context information stored by the old MME.

Step 1206 includes that the new MME sends a context confirmation message to the old MME.

Step 1207 includes that in the example, an SGW of the UE is not relocated. Then the new MME sends a bearer modification request message to the SGW of the UE to update S11 control plane information, such as an IP address of a GTP-C tunnel and a TEID.

Step 1208 includes that the SGW of the UE sends a bearer modification response message to the new MME.

Step 1209 includes that the new MME of the UE sends an S1 message to the MRN, wherein the S1 message includes Information about acceptance of NAS information by TAU, and may be a downlink NAS transmission message or an initial context establishment request message or an E-RAB establishment request message. If the UE sets "active flag" in the TAU request, the MME performs bearer establishment for the UE at this time, and the new MME sends the identifier information of the serving cell to which the UE is connected last time to the MRN in the bearer establishment process. Because of the S1 proxy function of the DeNB, the S1 message is sent to the MRN after passing through the DeNB.

Step 1210 includes that the MRN performs a LIPA connection releasing check according to the identifier information of the serving cell to which the UE is connected last time in the message after receiving the initial context establishment request message or the E-RAB establishment request message, specifically as described in Step 805.

Step 1211 includes that if the MRN determines to release the LIPA PDN connection of the UE, the MRN indicates the connected local GW to release the LIPA PDN connection of the UE. For example, an LGW can initiate a bearer deactivation flow.

Step 1212 includes that the MRN sends the Information about acceptance of NAS information by TAU to the UE through an RRC message.

Example 8

Figure 13:
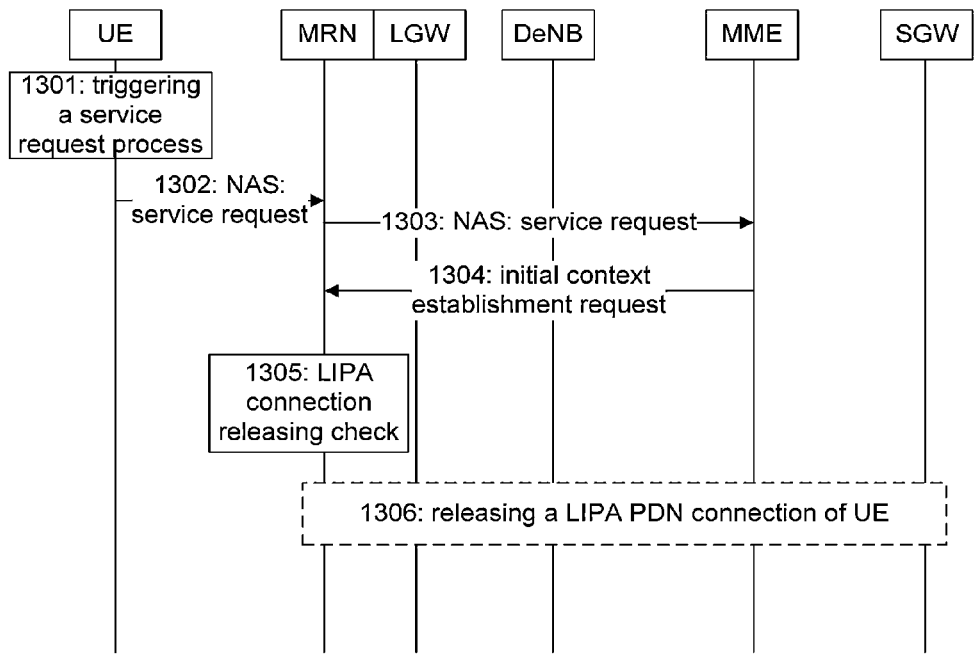
FIG. 13 is a flowchart of example 4 according to the present disclosure.

The example describes a flow of executing a LIPA connection releasing check by the MRN in the service request process, as shown in FIG. 13.

Step 1301 includes that the UE triggers a service process, for example, receiving paging for the UE.

Step 1302 includes that the UE needs to be synchronized with and establish an RRC connection with the MRN, and then sends an RRC message containing an NAS information service request to the MRN. The RRC message is an RRC establishment completion message or an uplink information transmission message. The UE needs to send the identifier information of the serving cell to which the UE is connected last time to the MME. Specifically, the information may be included in NAS information, and may not be included in the NAS information.

Step 1303 includes that the MRN sends the received NAS information service request through an S1 interface message to the MME indicated in the RRC message by the UE, and sends the received identifier information of the serving cell to which the UE is connected last time to the MME through the S1 interface message. Specifically, the information may be included in the NAS information or not included in the NAS information. Because of an S1 proxy function of a DeNB, the S1 interface message needs to arrive at the MME after passing through the DeNB. The S1 interface message may be an initial user message or an uplink NAS transmission message.

Step 1304 includes that the MME sends an S1 interface initial context establishment request message to the MRN to establish a corresponding bearer for the UE. The S1 message includes the identifier information of the serving cell to which the UE is connected last time. Because of the S1 proxy function of the DeNB, the message is sent to the MRN after passing through the DeNB.

Step 1305 includes that the MRN performs a LIPA connection releasing check according to the identifier information of the serving cell to which the UE is connected last time in the message after receiving the initial context establishment request message, specifically as described in Step 805.

Step 1306 includes that if the MRN determines to release the LIPA PDN connection of the UE, the MRN indicates the connected local GW to release the LIPA PDN connection of the UE. For example, an LGW can initiate a bearer deactivation flow.

Method Embodiment 5

Figure 9:
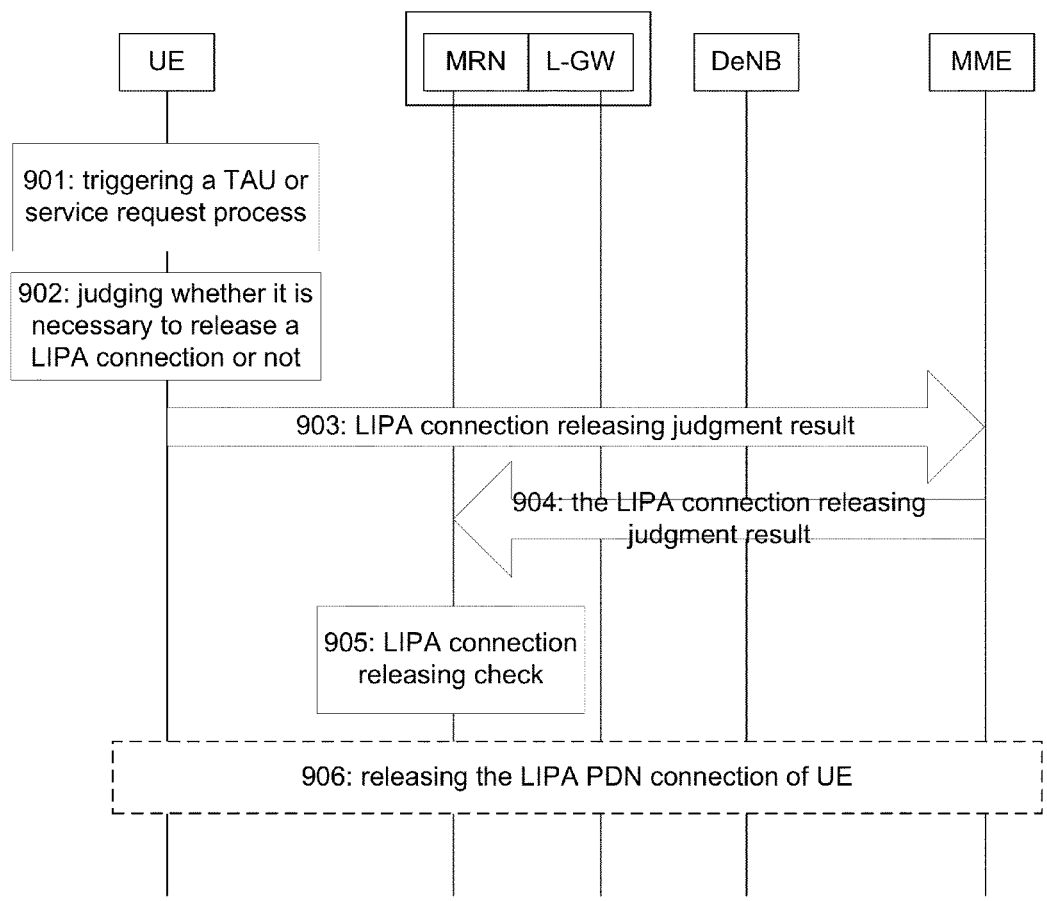
FIG. 9 is a flowchart of a method for releasing a LIPA connection according to embodiment 5 of the present disclosure.

The embodiment describes a method that UE indicates a LIPA connection releasing judgment result to an MME after judging whether it is necessary to release a LIPA connection or not, the MME sends the LIPA connection releasing judgment result to an MRN during bearer establishment and the MRN executes a LIPA connection releasing check. FIG. 9 is a flowchart of a method for releasing a LIPA connection according to embodiment 5 of the present disclosure, and as shown in FIG. 9, the method for releasing a LIPA connection according to the embodiment includes the following steps 901-906.

Step 901 includes that the UE triggers a TAU or service request process.

Step 902 includes that the UE sends identifier information of a serving cell to which the UE is connected last time to the MME.

Step 903 includes that if the MME subsequently initiates a bearer establishment process for the UE, the MME indicates the received identifier information of the serving cell to which the UE is connected last time to the MRN in the bearer establishment process.

Step 904 includes that the MRN performs a LIPA connection releasing check according to a LIPA connection releasing judgment result indicated by the MME, wherein there are several conditions as follows:

1) if the UE has the LIPA PDN connection, the LIPA connection releasing auxiliary information received by the MRN is LIPA connection releasing indication information and the LIPA connection releasing indication information indicates that it is necessary to release the LIPA PDN connection, then the MRN determines to release the LIPA PDN connection of the UE;

2) if the UE has the LIPA PDN connection, the LIPA connection releasing auxiliary information received by the MRN is LIPA connection releasing indication information and the LIPA connection releasing indication information indicates that it is unnecessary to release the LIPA PDN connection, then the MRN determines not to release the LIPA PDN connection of the UE; and 3) if the UE has the LIPA PDN connection and the MRN does not receive the LIPA connection releasing auxiliary information, that is, it is implicitly indicated that it is necessary to release the LIPA PDN connection, then the MRN determines to release the LIPA PDN connection of the UE.

Step 905 includes that if the MRN determines to release the LIPA PDN connection of the UE, the MRN indicates a connected local GW to release the LIPA PDN connection of the UE.

When the method in embodiment 5 is adopted, each message flow in specific scenarios is respectively described in the following examples.

Example 9

Example 9 describes a flow of executing a LIPA connection releasing check by the MMR in a TAU process, as shown in FIG. 12.

Compared with example 7, the example has the difference that the UE is required to judge whether it is necessary to release the LIPA PDN connection or not while the MME is not required to make such judgment. Specific differences are as follows:

1) in Step 1202, the UE judges whether it is necessary to release the LIPA PDN connection of the UE or not before sending the TAU request, and indicates a judgment result to the MME;

2) in Step 1203, the MRN sends LIPA connection releasing indication information to the MME through a S1 interface message;

3) the context request message in Step 1204 contains LIPA connection releasing indication information;

4) the initial context establishment request message in Step 1209 contains LIPA connection releasing indication information; and 5) in Step 1210, the MRN performs a LIPA connection releasing check according to the LIPA connection releasing judgment result of the UE. Specific details have been described in Step 904.

Example 10

Example 10 describes a flow of executing a LIPA connection releasing check by the MRN in a service request process, as shown in FIG. 13.

Compared with example 8, the example has the difference that the UE is required to judge whether it is necessary to release the LIPA PDN connection or not while the MME is not required to perform such judgment. Specific differences are as follows:

1) in Step 1302, the UE judges whether it is necessary to release a LIPA PDN connection of the UE or not before sending the service request, and indicates a judgment result to the MME;

2) in Step 1303, the MRN sends LIPA connection releasing indication information to the MME through a S1 interface message;

3) the initial context establishment request message in Step 1304 contains LIPA connection releasing indication information; and 5) in Step 1305, the MRN performs a LIPA connection releasing check according to the LIPA connection releasing judgment result of the UE. Specific details are described in Step 904.

Figure 14:
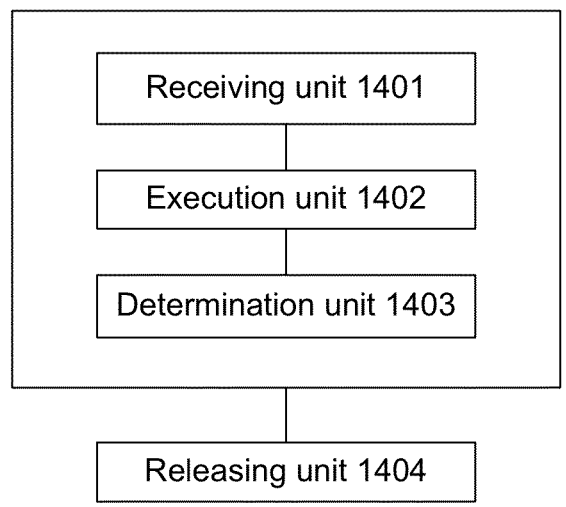
FIG. 14 is a structure diagram of a device for releasing a LIPA connection according to embodiment 1 of the present disclosure.

FIG. 14 is a structure diagram of a device for releasing a LIPA connection according to embodiment 1 of the present disclosure, and as shown in FIG. 14, the device for releasing a LIPA connection according to the embodiment includes a receiving unit 1401, an execution unit 1402 and a determination unit 1403, wherein the receiving unit 1401 is configured to receive LIPA connection releasing auxiliary information;

the execution unit 1402 is configured to execute a LIPA connection releasing check according to the LIPA connection releasing auxiliary information; and the determination unit 1403 is configured to determine whether to release a LIPA connection of UE or not.

The LIPA connection releasing auxiliary information includes at least one piece of information as follows:

LIPA connection releasing indication information; and identifier information of a serving cell to which the UE is connected last time.

The receiving unit 1401 is further configured to receive from a wireless-side network element the identifier information of the serving cell to which the UE is connected last time, wherein the wireless-side network element receives the identifier information of the serving cell to which the UE is connected last time from the UE, and sends the identifier information to the receiving unit;

or, the receiving unit 1401 is further configured to receive the LIPA connection releasing indication information sent by the wireless-side network element, wherein the wireless-side network element judges whether it is necessary to release the LIPA connection of the UE or not according to the identifier information of the serving cell to which the UE is connected last time when receiving from the UE the identifier information of the serving cell to which the UE is connected last time, and sends a judgment result to the receiving unit 1401 through the LIPA connection releasing indication information;

or, the receiving unit 1401 is further configured to receive the LIPA connection releasing indication information sent by the UE, wherein the UE judges whether it is necessary to release own LIPA connection or not, and sends a judgment result to the receiving unit 1401 through the LIPA connection releasing indication information.

The execution unit 1402 is further configured to execute a LIPA connection releasing check according to the LIPA connection releasing auxiliary information in a TAU or service request process.

The determination unit 1403 is further configured to determine whether a cell currently accessed by the UE is the same as the serving cell to which the UE is connected last time or not when the LIPA connection releasing indication information received by the receiving unit 1401 is the identifier information of the serving cell to which the UE is connected last time, and to determine that it is unnecessary to release the LIPA connection of the UE if they are the same, otherwise determine that it is necessary to release the LIPA connection of the UE;

or, the determination unit 1403 is further configured to judge whether the cell currently accessed by the UE and the serving cell to which the UE is connected last time belong to the same eNB or not when the LIPA connection releasing indication information received by the receiving unit 1401 is the identifier information of the serving cell to which the UE is connected last time, and to determine that it is unnecessary to release the LIPA connection of the UE if they belong to the same eNB, otherwise determine that it is necessary to release the LIPA connection of the UE;

the determination unit 1403 is further configured to determine that it is necessary to release the LIPA connection of the UE when determining that the LIPA connection releasing indication information received by the receiving unit 1401 indicates to release the LIPA connection of the UE, and determine that it is unnecessary to release the LIPA connection of the UE when the LIPA connection releasing indication information indicates not to release the LIPA connection of the UE;

or, the determination unit 1403 is further configured to determine that it is necessary to release the LIPA connection of the UE when determining that the receiving unit does not receive the LIPA connection releasing auxiliary information within a set time period.

As shown in FIG. 14, the device for releasing a LIPA connection according to the embodiment further includes:

a releasing unit 1404, configured to initiate a PDN disconnection process to release the LIPA connection of the UE when the determination unit 1403 determines that it is necessary to release the LIPA connection of the UE.

Those skilled in the art should know that the releasing unit is set to optimize the device for releasing a LIPA connection according to the present disclosure, and is not a necessary technical means for achieving a basic purpose of the device for releasing a LIPA connection according to the present disclosure.

Those skilled in the art should know that functions of processing units involved in the device for releasing a LIPA connection shown in FIG. 14 can be implemented by a hardware circuit or by executing corresponding software through a processor. The functions of each processing unit can be understood with reference to the descriptions in the related embodiments and examples of the method for releasing a LIPA connection according to the present disclosure.

The present disclosure further provides a mobility management unit, which includes the device for releasing aLIPA connection shown in FIG. 14. The mobility management unit may be an MME, an SGSN or the like.

Figure 15:
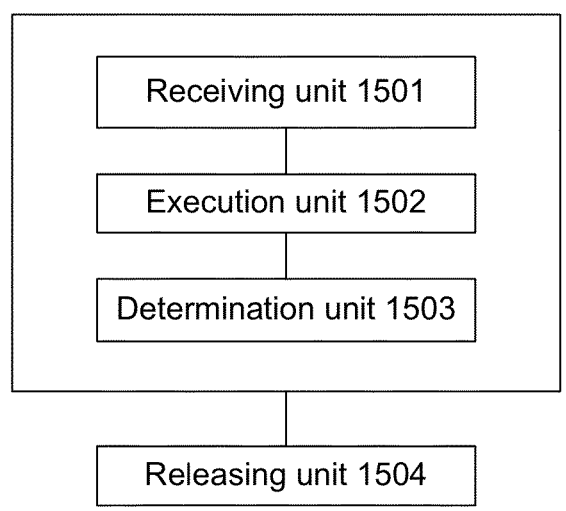
FIG. 15 is a structure diagram of a device for releasing a LIPA connection according to embodiment 2 of the present disclosure.

FIG. 15 is a structure diagram of a device for releasing a LIPA connection according to embodiment 2 of the present disclosure, and as shown in FIG. 15, the device for releasing a LIPA connection according to the embodiment includes a receiving unit 1501, an execution unit 1502 and a determination unit 1503, wherein the receiving unit 1501 is configured to receive LIPA connection releasing auxiliary information;

the execution unit 1502 is configured to execute a LIPA connection releasing check according to the LIPA connection releasing auxiliary information; and the determination unit 1503 is configured to determine whether to release a LIPA connection of UE or not.

The LIPA connection releasing auxiliary information includes at least one piece of information as follows:

LIPA connection releasing indication information; and identifier information of a serving cell to which the UE is connected last time.

The receiving unit 1501 is further configured to receive from a mobility management unit the identifier information of a serving cell to which the UE is connected last time, wherein the UE sends the identifier information of the serving cell to which the UE is connected last time to the mobility management unit through NAS information; and the mobility management unit sends the identifier information of the serving cell to which the UE is connected last time to the receiving unit 1501 when executing a bearer establishment process;

or, the receiving unit 1501 is further configured to receive the LIPA connection releasing indication information sent by the UE, wherein the UE judges whether it is necessary to release own LIPA connection or not, and indicates a judgment result to the mobility management unit through the LIPA connection releasing indication information; and the mobility management unit indicates the judgement result to the receiving unit 1501 through the LIPA connection releasing indication information when executing the bearer establishment process.

The determination unit 1503 is further configured to determine that the LIPA connection releasing auxiliary information received by the receiving unit 1501 is LIPA connection releasing indication information, and to determine to release the LIPA connection of the UE when the LIPA connection releasing indication information indicates to release the LIPA connection, and to determine not to release the LIPA connection of the UE when the LIPA connection releasing indication information indicates not to release the LIPA connection;

the determination unit 1503 is further configured to judge whether a cell currently accessed by the UE is the same as the serving cell to which the UE is connected last time or not when the LIPA connection releasing auxiliary information received by the receiving unit 1501 is the identifier information of the serving cell to which the UE is connected last time, and to determine that it is unnecessary to release the LIPA connection of the UE if they are the same, otherwise determine that it is necessary to release the LIPA connection of the UE;

or, the determination unit 1503 is further configured to judge whether the cell currently accessed by the UE and the serving cell to which the UE is connected last time belong to the same eNB or not when determining that the LIPA connection releasing auxiliary information received by the receiving unit 1501 is the identifier information of the serving cell to which the UE is connected last time, and to determine that it is unnecessary to release the LIPA connection of the UE if they belong to the same eNB, otherwise determine that it is necessary to release the LIPA connection of the UE;

or, the determination unit 1503 is further configured to determine that it is necessary to release the LIPA connection of the UE when determining that the receiving unit does not receive the LIPA connection releasing auxiliary information within the set time period.

As shown in FIG. 15, the device for releasing a LIPA connection according to the embodiment further includes:

a releasing unit 1504, configured to indicate a connected local GW to release the LIPA connection of the UE when the determination unit determines that it is necessary to release the LIPA connection of the UE.

Those skilled in the art should know that the releasing unit is set to optimize the device for releasing a LIPA connection according to the present disclosure, and is not a necessary technical means for achieving a basic purpose of the device for releasing the LIPA connection according to the present disclosure.

Those skilled in the art should know that functions of processing units involved in the device for releasing a LIPA connection shown in FIG. 15 can be implemented by a hardware circuit or by executing corresponding software through a processor. The functions of each processing unit can be understood with reference to the descriptions in the related embodiments and examples of the method for releasing a LIPA connection according to the present disclosure.

The present disclosure further provides a wireless-side network element, which includes the device for releasing a LIPA connection shown in FIG. 15. The wireless-side network element may be an RN, an MRN, an HeNB, a DeNB, an HeNB GW and the like.

Obviously, those skilled in the art should know that each processing unit or step of the present disclosure can be implemented by a universal computing device, and the processing units or steps can be concentrated on a single computing device or distributed on a network formed by a plurality of computing devices, and can optionally be implemented by programmable codes executable for the computing devices, so that the processing units or steps can be stored in a storage device for execution with the computing devices, or can form each integrated circuit module, or multiple modules or steps therein can form a single integrated circuit module for implementation. As a consequence, the present disclosure is not limited to any specific hardware and software combination.

The above are only the preferred embodiments of the present disclosure and not intended to limit the scope of protection of the present disclosure.

INDUSTRIAL PRACTICABILITY

By the technical solutions of the present disclosure, the mobility management unit or the wireless-side network element executes a LIP connection releasing check according to received LIPA connection releasing auxiliary information, and judges whether to release the LIPA connection of the UE or not. The mobility management unit initiates a PDN disconnection process to release the LIPA connection of the UE when determining that it is necessary to release the LIPA connection of the UE; and the wireless-side network element directly indicates the connected local GW to release the LIPA connection of the UE when determining that it is necessary to release the LIPA connection of the UE. According to the technical solutions of the present disclosure, under the condition that a mobile relay supports LIPA, continuity of the LIPA connection of the UE in an MRN handover process is ensured, continuity of a LIPA service of the UE is further ensured, and the quality of service for a user and a user experience are improved.

What is claimed is:

1. A method for releasing a Local Internet Protocol Access (LIPA) connection, comprising:

executing, by a mobility management unit, a LIPA connection releasing check according to received LIPA connection releasing auxiliary information, and determining whether to release a LIPA connection of User Equipment (UE) or not;

wherein the LIPA connection releasing auxiliary information comprises at least one piece of information as follows:

LIPA connection releasing indication information; and identifier information of a serving cell to which the UE is connected last time;

wherein the step of receiving, by the mobility management unit, the LIPA connection releasing auxiliary information comprises:

judging, by a wireless-side network element, whether it is necessary to release the LIPA connection of the UE or not according to the identifier information of the serving cell to which the UE is connected last time when the wireless-side network element receives from the UE the identifier information of the serving cell to which the UE is connected last time, and indicating a judgment result to the mobility management unit through the LIPA connection releasing indication information;

wherein the step of judging whether it is necessary to release the LIPA connection of the UE or not according to the identifier information of the serving cell to which the UE is connected last time comprises:

judging, by the wireless-side network element, whether a cell currently accessed by the UE is the same as the serving cell to which the UE is connected last time or not according to the identifier information of the serving cell to which the UE is connected last time, determining that it is unnecessary to release the LIPA connection of the UE if the two cells are the same, otherwise, determining that it is necessary to release the LIPA connection of the UE;

or, judging, by the wireless-side network element, whether a cell currently accessed by the UE and the serving cell to which the UE is connected last time belong to a same Evolved Node B (eNB) or not according to the identifier information of the serving cell to which the UE is connected last time, determining that it is unnecessary to release the LIPA connection of the UE if the two cells belong to the same eNB, otherwise determining that it is necessary to release the LIPA connection of the UE.

2. The method according to claim 1, wherein the step of executing, by the mobility management unit, a LIPA connection releasing check according to the received LIPA connection releasing auxiliary information comprises:
  judging, by the mobility management unit, whether a cell currently accessed by the UE is the same as the serving cell to which the UE is connected last time or not according to the identifier information of the serving cell to which the UE is connected last time, and if the two cells are same, then determining that it is unnecessary to release the LIPA connection of the UE, otherwise determining that it is necessary to release the LIPA connection of the UE;
  or, judging, by the mobility management unit, whether a cell currently accessed by the UE and the serving cell to which the UE is connected last time belong to a same eNB or not according to the identifier information of the serving cell to which the UE is connected last time, and if the two cells belong to the same eNB, then determining that it is unnecessary to release the LIPA connection of the UE, otherwise determining that it is necessary to release the LIPA connection of the UE;
  or, determining, by the mobility management unit, that it is necessary to release the LIPA connection of the UE if determining that the received LIPA connection releasing indication information indicates to release the LIPA connection of the UE, and determining that it is unnecessary to release the LIPA connection of the UE if determining that the LIPA connection releasing indication information indicates not to release the LIPA connection of the UE;
  or, determining, by the mobility management unit, that it is necessary to release the LIPA connection of the UE if the mobility management unit does not receive the LIPA connection releasing auxiliary information within a set time period.

3. A method for releasing a Local Internet Protocol Access (LIPA) connection, comprising:
  executing, by a wireless-side network element, a LIPA connection releasing check according to received LIPA connection releasing auxiliary information, and judging whether to release a LIPA connection of User Equipment (UE) or not;
  wherein the LIPA connection releasing auxiliary information comprises at least one piece of information as follows:
    LIPA connection releasing indication information; and
    identifier information of a serving cell to which the UE is connected last time;
  wherein the step of receiving, by the wireless-side network element, the LIPA connection releasing auxiliary information comprises:
    sending, by the UE, the identifier information of the serving cell to which the UE is connected last time to a mobility management unit through Non-Access Stratum (NAS) information; and sending, by the mobility management unit, the identifier information of the serving cell to which the UE is connected last time to the wireless-side network element when the mobility management unit executes a bearer establishment process;
    or, judging, by the UE, whether it is necessary to release own LIPA connection or not, and indicating a judgment result to the mobility management unit through the LIPA connection releasing indication information; and indicating, by the mobility management unit, the judgement result to the wireless-side network element through the LIPA connection releasing indication information when the mobility management unit executes a bearer establishment process.

4. The method according to claim 3, wherein the step of executing, by the wireless-side network element, a LIPA connection releasing check according to the received LIPA connection releasing auxiliary information comprises:
  determining, by the wireless-side network element, that the received LIPA connection releasing auxiliary information is the LIPA connection releasing indication information, determining, by the wireless-side network element, to release the LIPA connection of the UE when the LIPA connection releasing indication information indicates to release the LIPA connection, and determining, by the wireless-side network element, not to release the LIPA connection of the UE when the LIPA connection releasing indication information indicates not to release the LIPA connection;
  or, determining, by the wireless-side network element, that the received LIPA connection releasing auxiliary information is the identifier information of the serving cell to which the UE is connected last time, judging whether a cell currently accessed by the UE is the same as the serving cell to which the UE is connected last time or not according to the identifier information of the serving cell to which the UE is connected last time, determining that it is unnecessary to release the LIPA connection of the UE if the two cells are the same, otherwise determining that it is necessary to release the LIPA connection of the UE;
  or, judging, by the wireless-side network element, whether a cell currently accessed by the UE and the serving cell to which the UE is connected last time belong to a same Evolved Node B (eNB) or not according to the identifier information of the serving cell to which the UE is connected last time, determining that it is unnecessary to release the LIPA connection of the UE if the two cells belong to the same eNB, otherwise determining that it is necessary to release the LIPA connection of the UE;
  or, determining, by the wireless-side network element, that it is necessary to release the LIPA connection of the UE if the wireless-side network element does not receive the LIPA connection releasing auxiliary information within a set time period.

5. The method according to claim 3, after the wireless-side network element executes the LIPA connection releasing check according to the received LIPA connection releasing auxiliary information, the method further comprising:
  indicating, by the wireless-side network element, a connected local Gateway (GW) to release the LIPA connection of the UE when the wireless-side network element determines that it is necessary to release the LIPA connection of the UE.

6. A device for releasing a Local Internet Protocol Access (LIPA) connection, comprising a memory storing programmed instructions; and a processor configured to execute the programmed instructions comprising:
  receiving LIPA connection releasing auxiliary information;
  executing a LIPA connection releasing check according to the LIPA connection releasing auxiliary information; and
  determining whether to release a LIPA connection of User Equipment (UE) or not;

wherein the LIPA connection releasing auxiliary information comprises at least one piece of information as follows:
LIPA connection releasing indication information; and
identifier information of a serving cell to which the UE is connected last time;
wherein the receiving LIPA connection releasing auxiliary information comprises:
receiving from a mobility management unit the identifier information of the serving cell to which the UE is connected last time, wherein the UE sends the identifier information of the serving cell to which the UE is connected last time to the mobility management unit through Non-Access Stratum (NAS) information; and the mobility management unit is configured to send the identifier information of the serving cell to which the UE is connected last time to the device for releasing the LIPA connection when executing a bearer establishment process;
or, receiving the LIPA connection releasing indication information sent by the UE, wherein the UE judges whether it is necessary to release own LIPA connection or not, and indicates a judgment result to a mobility management unit through the LIPA connection releasing indication information; and the mobility management unit indicates the judgement result to the device for releasing the LIPA connection through the LIPA connection releasing indication information when executing a bearer establishment process.

7. The device according to claim 6, wherein the determining whether to release the LIPA connection of UE or not, comprises:
judging whether a cell currently accessed by the UE is the same as the serving cell to which the UE is connected last time or not when the LIPA connection releasing indication information received by the receiving unit is the identifier information of the serving cell to which the UE is connected last time, and determining that it is unnecessary to release the LIPA connection of the UE if the two cells are same, otherwise determining that it is necessary to release the LIPA connection of the UE;
or, judging whether a cell currently accessed by the UE and the serving cell to which the UE is connected last time belong to a same Evolved Node B (eNB) or not when the LIPA connection releasing indication information is the identifier information of the serving cell to which the UE is connected last time, and determining that it is unnecessary to release the LIPA connection of the UE if the two cells belong to the same eNB, otherwise determining that it is necessary to release the LIPA connection of the UE;
or, determining that it is necessary to release the LIPA connection of the UE when determining that the LIPA connection releasing indication information indicates to release the LIPA connection of the UE, and determining that it is unnecessary to release the LIPA connection of the UE when the LIPA connection releasing indication information indicates not to release the LIPA connection of the UE;
or, determining that it is necessary to release the LIPA connection of the UE when determining that the receiving unit does not receive the LIPA connection releasing auxiliary information within a set time period.

8. The device according to claim 6, wherein the determining whether to release the LIPA connection of UE or not, comprises:
determining that the LIPA connection releasing auxiliary information is the LIPA connection releasing indication information, determining to release the LIPA connection of the UE when the LIPA connection releasing indication information indicates to release the LIPA connection, and determining not to release the LIPA connection of the UE when the LIPA connection releasing indication information indicates not to release the LIPA connection;
or,
judging whether a cell currently accessed by the UE is the same as the serving cell to which the UE is connected last time or not when the LIPA connection releasing auxiliary information is the identifier information of the serving cell to which the UE is connected last time, and determining that it is unnecessary to release the LIPA connection of the UE if the two cells are the same, otherwise determining that it is necessary to release the LIPA connection of the UE;
or, judging whether a cell currently accessed by the UE and the serving cell to which the UE is connected last time belong to a same eNB or not when determining that the LIPA connection releasing auxiliary information is the identifier information of the serving cell to which the UE is connected last time, and determining that it is unnecessary to release the LIPA connection of the UE if the two cells belong to the same eNB, otherwise determining that it is necessary to release the LIPA connection of the UE;
or, determining that it is necessary to release the LIPA connection of the UE when determining that the LIPA connection releasing auxiliary information is within a set time period.

9. The device according to claim 6, the processor configured to execute the programmed instructions further comprising:
indicating a connected local Gateway (GW) to release the LIPA connection of the UE when the determination unit determines that it is necessary to release the LIPA connection of the UE.

* * * * *